(12) United States Patent
Terakawa et al.

(10) Patent No.: US 7,130,503 B2
(45) Date of Patent: Oct. 31, 2006

(54) OPTICAL MULTIPLEXER/DEMULTIPLEXER

(75) Inventors: Yukari Terakawa, Kyoto (JP); Toshinari Mori, Nara (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 10/842,996

(22) Filed: May 11, 2004

(65) Prior Publication Data

US 2004/0228573 A1    Nov. 18, 2004

(30) Foreign Application Priority Data

May 15, 2003    (JP)    ............................. 2003-137789

(51) Int. Cl.
*G02B 6/28*    (2006.01)
*H04J 14/04*    (2006.01)

(52) U.S. Cl. .......................................... 385/24; 398/43
(58) Field of Classification Search ................... 385/24; 398/43

See application file for complete search history.

(56) References Cited

U.S. PATENT DOCUMENTS

| | | | | |
|---|---|---|---|---|
| 5,764,825 A * | 6/1998 | Mugino et al. | ................. | 385/24 |
| 6,445,849 B1 * | 9/2002 | Kinoshita et al. | ............. | 385/24 |
| 6,539,145 B1 * | 3/2003 | Auracher et al. | ............. | 385/24 |
| 6,711,325 B1 * | 3/2004 | Hwang et al. | ................. | 385/24 |
| 6,760,510 B1 * | 7/2004 | Kimura | ........................ | 385/24 |
| 6,856,722 B1 * | 2/2005 | Sasaki et al. | .................. | 385/24 |
| 2002/0197008 A1 * | 12/2002 | Kim et al. | ...................... | 385/24 |

FOREIGN PATENT DOCUMENTS

JP    9-236725    9/1997
JP    2002-277674    9/2002

OTHER PUBLICATIONS

Patent Abstracts of Japan; Publication No. 09-236725 dated Sep. 9, 1997 (2 pgs.).
Patent Abstracts of Japan; Publication No. 2002-277674 dated Sep. 25, 2002 (2 pgs.).

* cited by examiner

*Primary Examiner*—Sung Pak
*Assistant Examiner*—Tina M. Wong
(74) *Attorney, Agent, or Firm*—Osha Liang LLP

(57) ABSTRACT

Light of wavelengths $\lambda 2$ and $\lambda 3$ ($\lambda 2 < \lambda 3$) is propagated in a first core. The light emitted form the first core is divided at a filter. That is, the light of the wavelength $\lambda 2$ transmits through the filter and is made incident onto a third core while the light of the wavelength $\lambda 3$ is reflected from a filter and is made incident onto a second core. The second core has a sectional area which works in a single mode for the light of the wavelength $\lambda 3$ and works in a multiple mode for the light of the wavelength $\lambda 2$. It is therefore possible to prevent noise or stray light in an optical multiplexer/demultiplexer.

7 Claims, 20 Drawing Sheets

PRIOR ART

PRIOR ART

PRIOR ART

Fig. 12A1
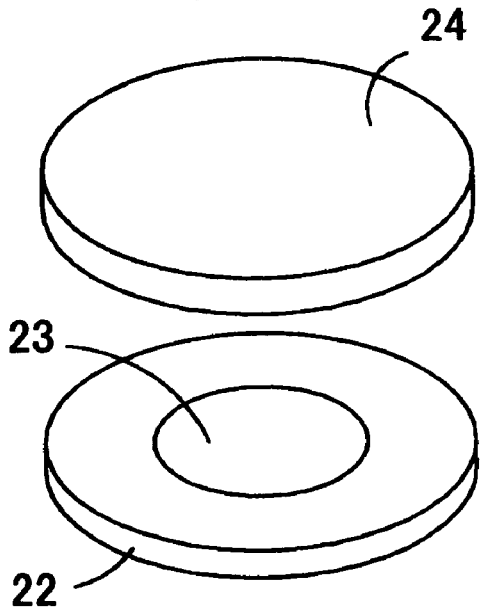
Fig. 12A2
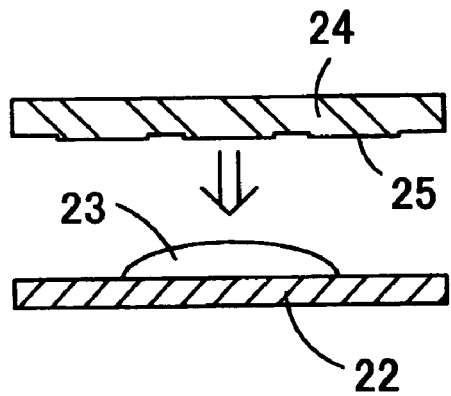
Fig. 12B1
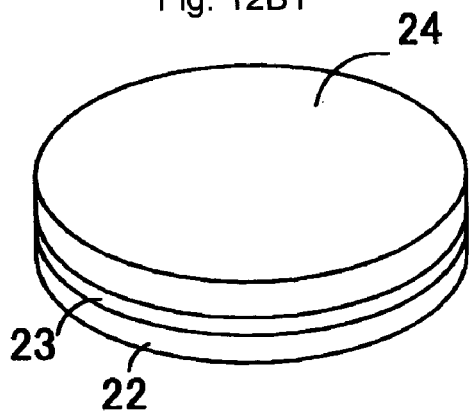
Fig. 12B2
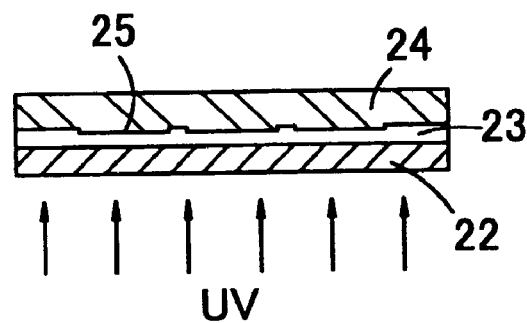
Fig. 12C1
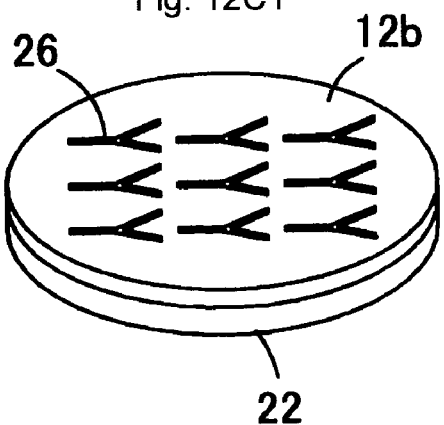
Fig. 12C2
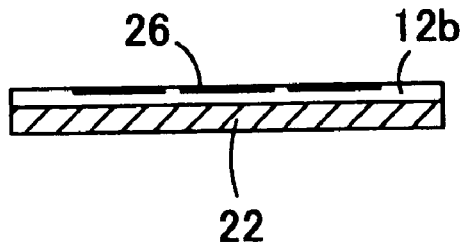

Fig. 13D1
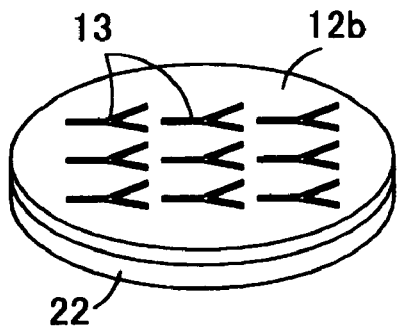
Fig. 13D2
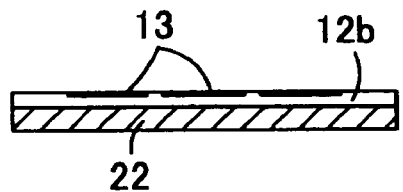
Fig. 13E1
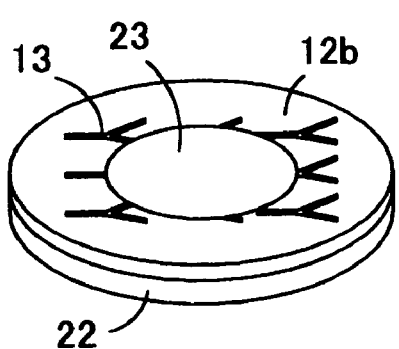
Fig. 13E2
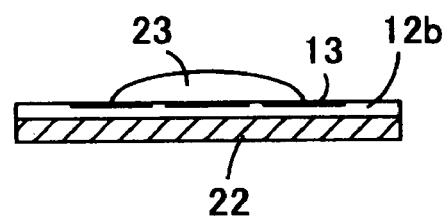
Fig. 13F1
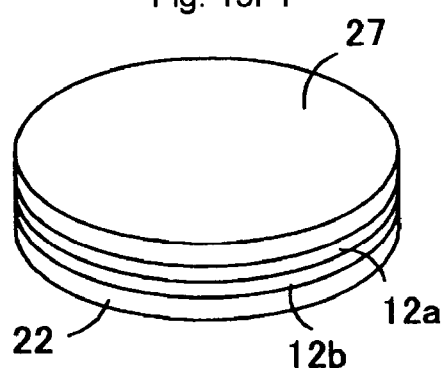
Fig. 13F2
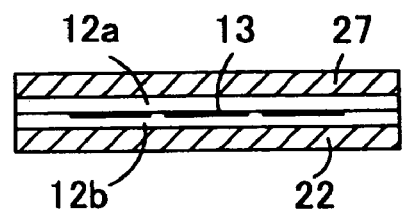
Fig. 13G1
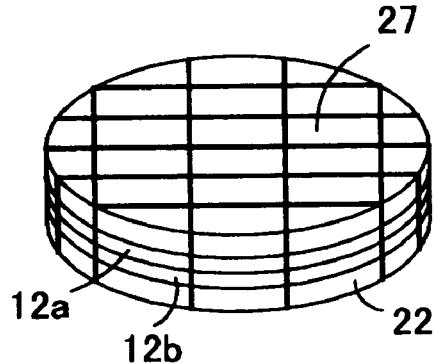
Fig. 13G2
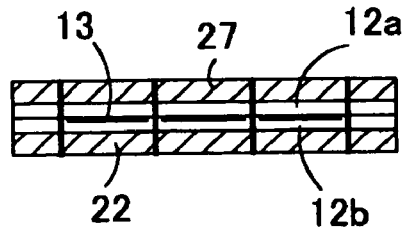

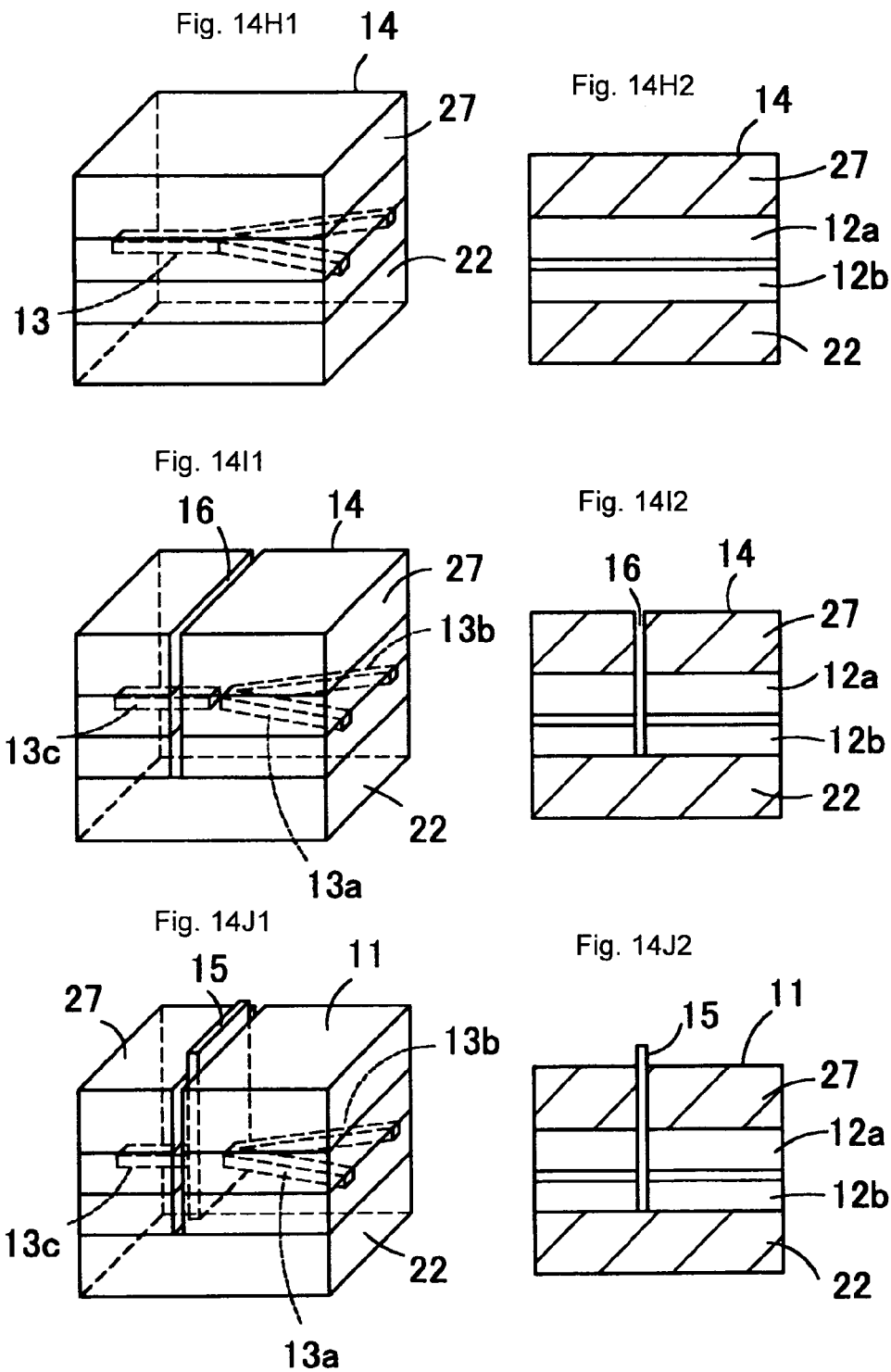

OPTICAL MULTIPLEXER/DEMULTIPLEXER

BACKGROUND OF THE INVENTION

1. Field of the Invention

The present invention relates to an optical multiplexer/demultiplexer.

2. Description of the Related Art

Various kinds of structures of an optical multiplexer/demultiplexer have been proposed in the field of optical communications. FIG. 1 shows the structure of a conventional optical multiplexer/demultiplexer using a dielectric multilayer filter, in which a clad is cross-sectioned along a plane passing an upper face of a core. According to the optical multiplexer/demultiplexer 1, an optical waveguide 4 is constituted such that cores 3a, 3b and 3c are buried in a clad 2 made of a transparent material. In the optical waveguide 4, a groove 6 for a filter 5 such as a dielectric multilayer filter is formed, and the filter 5 is inserted in the groove 6. The first and second cores 3a and 3b are provided in the clad 2 positioned at one side of the groove 6, and are connected in the approximate V-shape at the end facing the groove 6. In addition, the third core 3c is provided in the clad 2 positioned at the other side of the groove 6 such that its end is opposed to the end of the first core 3a.

In addition, an optical fiber 7a is coupled to an end face of the first core 3a; an optical fiber 7b is coupled to an end face of the second core 3b; and an optical fiber 7c is coupled to an end face of the third core 3c.

It is assumed herein that the filter 5 used in this optical multiplexer/demultiplexer 1 has characteristics of making the light of wavelengths $\lambda 1$ and $\lambda 2$ transmit therethrough and making the light of a wavelength $\lambda 3$ reflect therefrom among the light of the wavelengths $\lambda 1$, $\lambda 2$ and $\lambda 3$ ($\lambda 1 < \lambda 2 < \lambda 3$), for example. According to the optical multiplexer/demultiplexer 1, as shown by arrows of solid line in FIG. 1, when the light of the wavelength $\lambda 2$ and the light of the wavelength $\lambda 3$ are simultaneously made incident from the optical fiber 7a onto the first core 3a, for example, the light propagated in the first core 3a and emitted from the end face thereof opposed to the filter 5 is divided into the second core 3b and the third core 3c by the filter 5. That is, among the light emitted from the first core 3a, the light of the wavelength $\lambda 2$ transmits through the filter 5, in made incident onto the third core 3c, is propagated the third core 3c and is coupled to the optical fiber 7c. At the same time, the light of the wavelength $\lambda 3$ emitted from the end face of the first core 3a is reflected from the filter 5, is made incident onto the second core 3b, is propagated in the second core 3b is and coupled to the optical fiber 7b.

In addition, as shown by arrows of broken line in FIG. 1, when the light of the wavelength $\lambda 1$ is made incident from the optical fiber 7c onto the third core 3c, the light of the wavelength $\lambda 1$ is propagated in the third core 3c, is emitted from the end face thereof opposed to the filter 5, transmits through the filter 5, is made incident onto the first core 3a, is propagated in the first core 3a and is coupled to the optical fiber 7a.

According to the above-described optical multiplexer/demultiplexer 1, as shown FIG. 2 in which an X part in FIG. 1 is enlarged, the end of the first core 3a and the end of the second core 3b are connected in approximate V-shape, and both cores 3a and 3b are overlapped with each other over a distance L shown in FIG. 2. The light of the wavelengths $\lambda 1$, $\lambda 2$ and $\lambda 3$ is all single-mode light, and the cores 3a, 3b and 3c propagate the light of the wavelengths $\lambda 1$, $\lambda 2$ and $\lambda 3$ in the single mode. Therefore, when the light of the wavelength $\lambda 2$ and the light of the wavelength $\lambda 3$ are made incident from the optical fiber 7a onto the first core 3a, the light is emitted from the first core 3a and, then, a part of the light of the wavelength $\lambda 2$ which is to transmit through the filter 5 and to be made incident onto the third core 3c enters the core 3b side in a region where the cores 3a and 3b are overlapped, so that the light is disadvantageously made incident onto the second core 3b in some cases. When this phenomenon occurs, the light of the wavelength $\lambda 2$ is mixed in the second core 3b which is provided for extracting only the light of the wavelength $\lambda 3$, so that the light of the wavelength $\lambda 2$ is coupled to the optical fiber 7b and becomes noise, which causes an adverse effect in which communication is hindered, for example.

Similarly, when the light of the wavelength $\lambda 1$ is made incident from the optical fiber 7c onto the third core 3c, a part of the light emitted from the end face of the third core 3c and transmitting through the filter 5 is not led to the first core 3a but made incident onto the second core 3b, so that it is propagated in the second core 3b and becomes noise, which lowers communication quality in some cases.

In order to reduce the above-described noise, there is known that a branching angle $\theta$ between the first and second cores 3a and 3b is increased and isolation between both cores 3a and 3b is enhanced by shortening the overlapped portion of the cores 3a and 3b (the portion shown by the distance L in FIG. 2). FIG. 3 shows a result obtained by making the light of the wavelength $\lambda 3$ of power P1 incident from the first core 3a onto the filter 5, measuring a power P3 of the light made incident onto the third core 3c and measuring its loss:

$$-10 \log [(P1-P3)/P1] \ (dB).$$

In FIG. 3, a vertical axis designates loss and a lateral axis designates a position (displacement) $\xi$ of the filter 5, in which a filter position showing a minimum loss is a reference point. In addition, in FIG. 3, a thick solid line shows the loss when the branching angle $\theta$ is 16° and a thin solid line shows the loss when the branching angle $\theta$ is 24°. As can be clear from the result shown in FIG. 3, the minimum value of loss (loss when $\xi = 0$) can be made smaller if the branching angle $\theta$ is made larger, so that noise is not likely to leak to the core 3b.

However, since a curve showing variation in loss becomes abrupt when the branching angle $\theta$ becomes large. According to the method of increasing the branching angle $\theta$ in order to reduce the noise, therefore, loss is largely varied by a slight variation of the filter position in the groove 6, so that the required position precision of the filter 5 becomes strict and it becomes difficult to manufacture the optical multiplexer/demultiplexer.

In addition, since it is necessary to align the end of the first core 3a and the end of the second core 3b in parallel so that optical axes may coincide with that of the optical fibers 7a and 7b, on the coupling side to the optical fibers 7a and 7b, when the branching angle $\theta$ between the cores 3a and 3b is increased, it is necessary to largely curve the first and second cores 3a and 3b in the middle for that. However, since a maximum curvature in which the cores 3a and 3b can be bent while keeping the light confined has been decided, the cores 3a and 3b cannot be bent below the predetermined curvature radius. Therefore, as the branching angle $\theta$ is increased, a length of the curved portion of each of the cores 3a and 3b has to be increased, so that the optical waveguide becomes large, cost of the optical waveguide is increased and propagation loss is also increased.

SUMMARY OF THE INVENTION

The present invention is made to solve the above technical problems and it is an object of the present invention to provide a method of reducing noise or stray light in an optical multiplexer/demultiplexer.

An optical multiplexer/demultiplexer according to a first aspect of the present invention comprises: a plurality of cores for a single-mode optically connected at one or more spots, for confining light to be propagated; and a filter element disposed at the place in which the cores are optically connected, for transmitting or reflecting the light of a specific wavelength. The optical multiplexer/demultiplexer separates light of a desired wavelength from single-mode light of a plurality of different wavelengths being propagated in one core, by the filter element so that light of the desired wavelength is propagated in another core, or combines light of different wavelengths being propagated in the different cores, by the filter element so that light of different wavelength is propagated in another core. The core which mainly propagates light of the longest wavelength among the cores propagates the light of the longest wavelength in a single mode and propagates the light of other wavelength in a multiple mode.

An optical multiplexer/demultiplexer according to a second aspect of the present invention comprises: a plurality of cores for a single mode optically connected in zigzags, for confining light to be propagated; and a plurality of filter element disposed at all places in which the cores are optically connected, for transmitting or reflecting the light of a specific wavelength. Single-mode light of a plurality of different wavelengths being propagated in the core reaches the filter element, the filter element transmits light of the shortest wavelength among the input light of different wavelengths therethrough and reflect light of another wavelength thereby, and the core in which light immediately after reflected by the filter element is propagated, propagates the light of the wavelength reflected by the filter element, in the single mode as it is, and propagates the light of the wavelength transmitting through the filter element, in a multiple mode.

In addition, the above-described components of the present invention can be optionally combined as much as possible.

BRIEF DESCRIPTION OF THE DRAWINGS

FIGS. 12A1, 12B1 and 12C1 show perspective views of manufacturing steps of the optical multiplexer/demultiplexer, and FIGS. 12A2, 12B2 and 12C2 show sectional views thereof.

FIGS. 13D1, 13E1, 13F1 and 13G1 show perspective views of steps subsequent to the step shown in FIG. 12C1, and FIGS. 13D2, 13E2, 13F2 and 13G2 show sectional views of steps subsequent to the step shown in FIG. 12C2.

FIGS. 14H1, 14I1 and 14J1 show perspective view of steps subsequent to the step shown in FIG. 13G1, and FIGS. 14H2, 14I2 and 14J2 show sectional views of steps subsequent to the step shown in FIG. 13G2.

DESCRIPTION OF THE PREFERRED EMBODIMENTS (First Embodiment)

Figure 4:
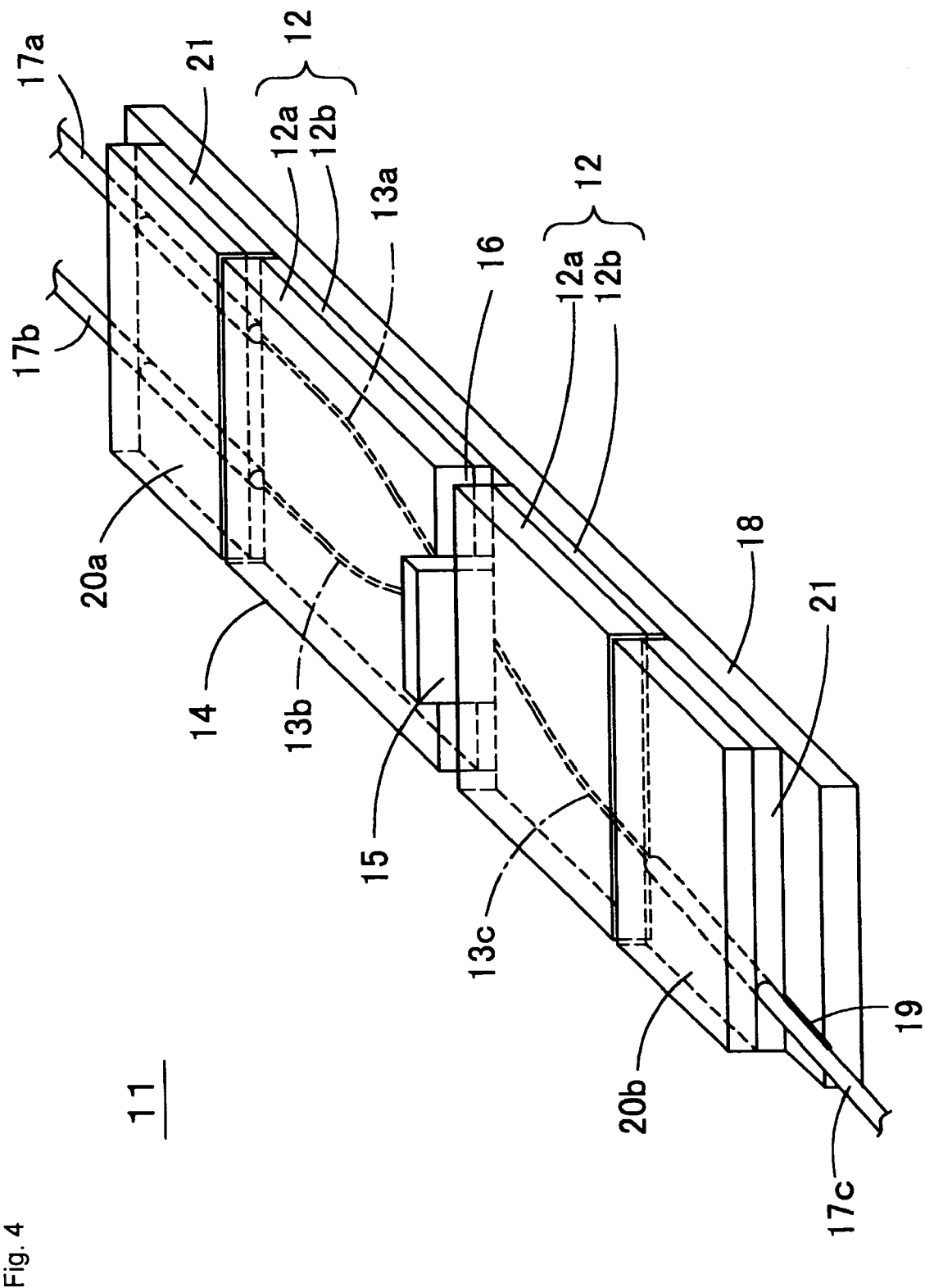
FIG. 4 shows a perspective view of an optical multiplexer/demultiplexer according to a first embodiment of the present invention.
Figure 5:
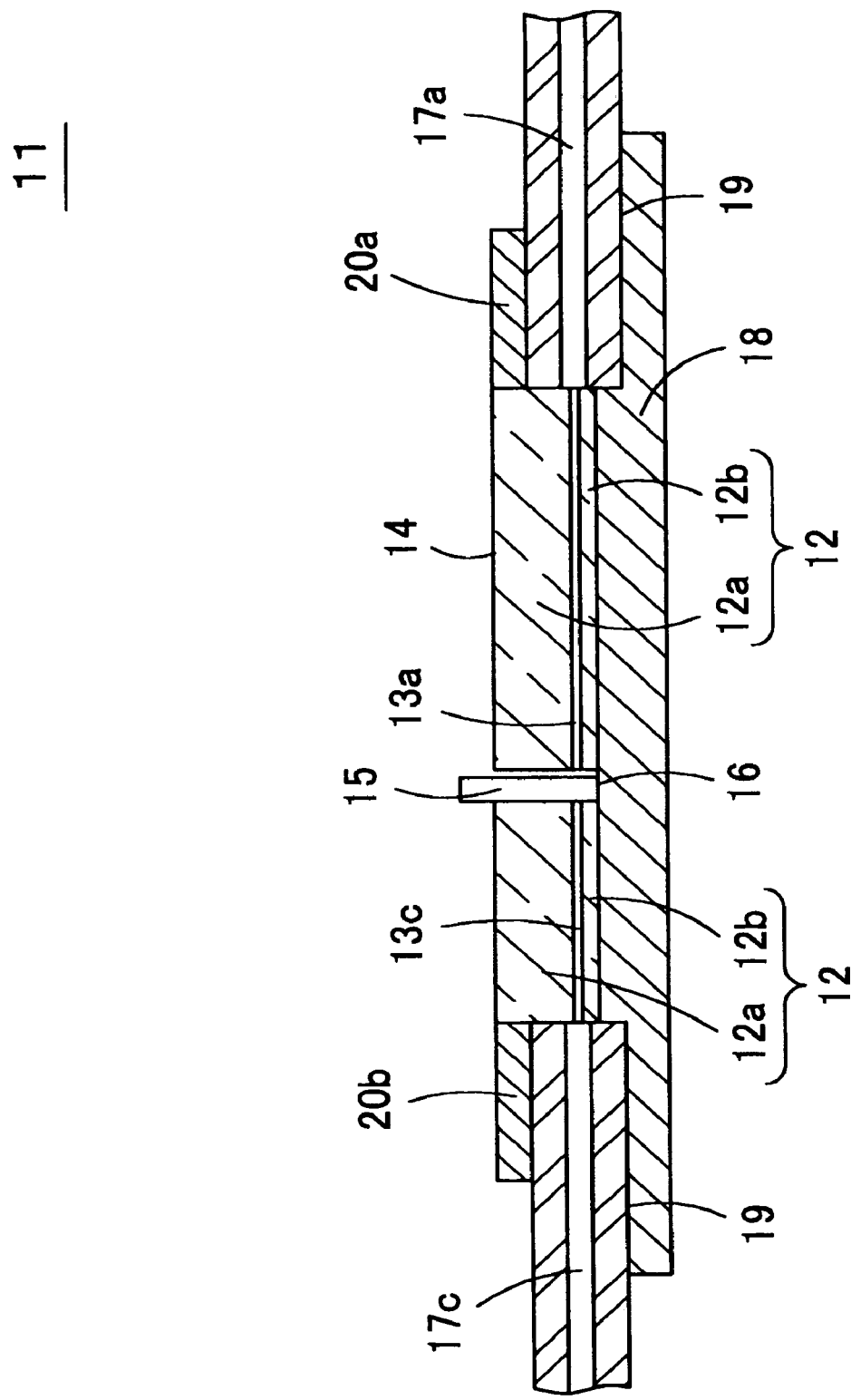
FIG. 5 shows a sectional view of the optical multiplexer/demultiplexer in FIG. 4 taken along an optical fiber and a core.

FIG. 4 shows a perspective view of an optical multiplexer/demultiplexer 11 according to a first embodiment of the present invention. In addition, FIG. 5 shows a sectional view of the optical multiplexer/demultiplexer 11 in FIG. 4 taken along optical fibers 17c and 17a and cores 13c and 13a. In the optical multiplexer/demultiplexer 11, an optical waveguide 14 and a filter element 15 are provided on an upper surface of a silicon substrate 18. In FIG. 4, the single-mode optical fibers 17a, 17b and 17c at use wavelength are connected to end faces of the cores 13a, 13b and 13c, respectively.

In the optical waveguide 14 constituting a main part of the optical multiplexer/demultiplexer 11, the cores 13a, 13b and 13c are buried in clads 12 made of a transparent plastic material or glass. The clad 12 comprises an upper clad 12a and a lower clad 12b which are overlapped with each other, and the cores 13a, 13b and 13c are sandwiched between the upper clad 12a and the lower clad 12b. The cores 13a, 13b and 13c are made of a polymer material, glass material such as quartz, optical crystal and the like which has refractive index higher than the clad 12. Although a configurations of cross-sections of the cores 13a, 13b and 13c is typically a rectangular, trapezoid, approximate hemicycle and the like, the configuration of the cross-sections of the cores is not limited particularly to be above except for manufacturing restriction. In addition, a configuration of the optical waveguide 14 is not limited to the configuration in which the cores are buried in the clad, and a ridge-shape of optical waveguide in which a convex core is formed on a planar clad layer is also included (which is the same in the following embodiments).

Each of the cores 13a, 13b and 13c of the optical waveguide 14 is a core for a single mode (which is the same in the following embodiments). The core for the single mode means that it is a single-mode core for light having a wavelength to be propagated in the core and the light having the wavelength is propagated as it is in the single mode.

Figure 6:
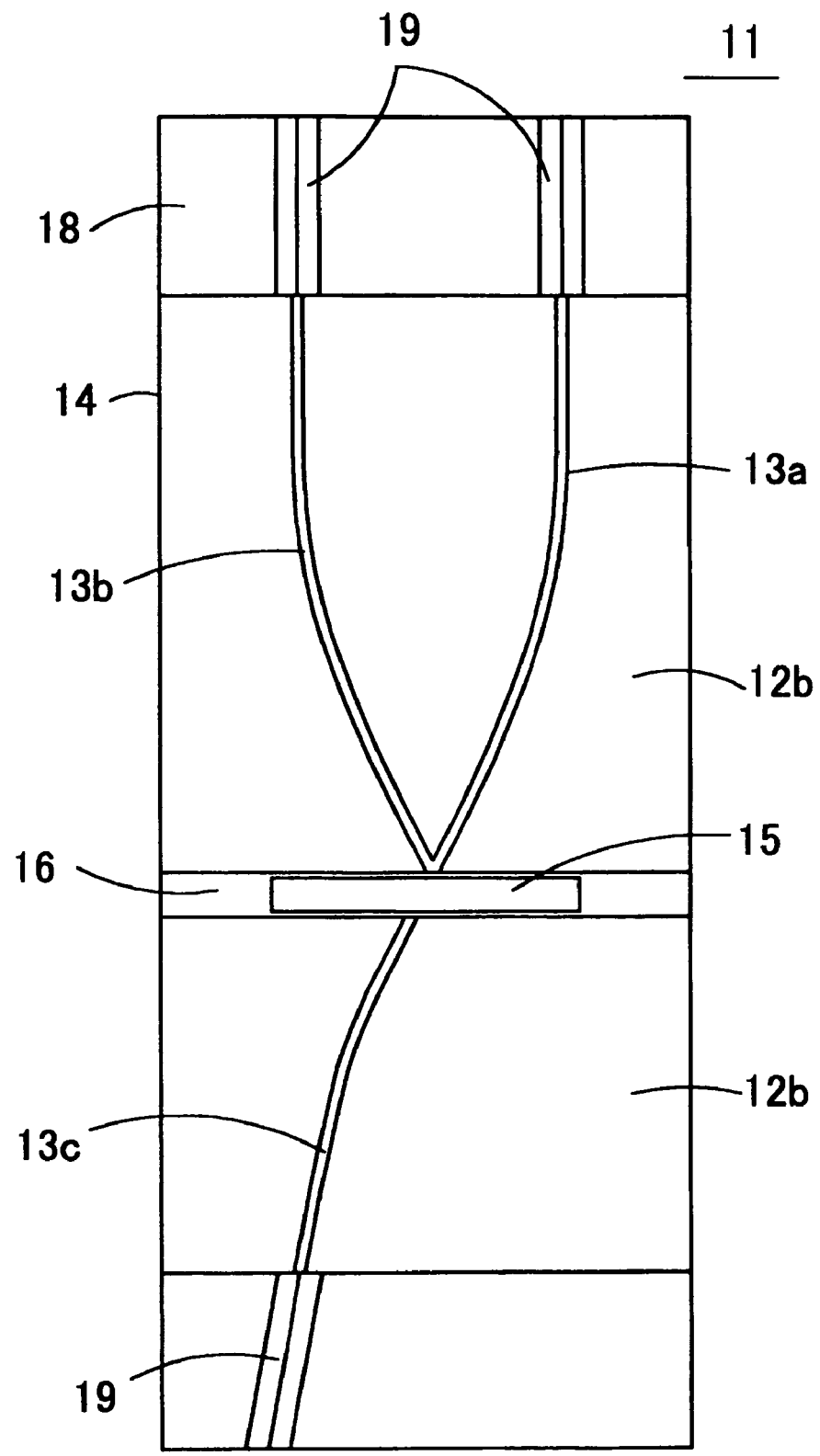
FIG. 6 shows a plan view of the optical multiplexer/demultiplexer shown in FIG. 4.

FIG. 6 shows a plan view of the optical multiplexer/demultiplexer 11, which is cut along an upper plane of the cores 13a, 13b and 13c. In the optical waveguide 14, a groove 16 to which the filter element 15 is inserted is formed so as to cross the width direction thereof, and end faces of the cores 13a, 13b and 13c are exposed in the groove 16. The first and second cores 13a and 13b are provided at one side of the groove 16, and are connected in approximate V-shape at the ends facing the groove 16. In addition, the third core 13c is provided at the other side of the groove 16 such that the end thereof may be linearly aligned to the end of the first core 13a and those ends may be opposed to each other. The filter element 15 consisting of a dielectric multilayer filter, a dividing/combining filter, a diffraction grating, a grating and the like is inserted in the groove 16, and end faces of the first, second and third cores 13a, 13b and 13c are opposed to the filter element 15.

In addition, the cores 13a, 13b and 13c have the following relations:

Sectional area of the second core 13b>sectional area of the first core 13a

Sectional area of the second core 13b>sectional area of the third core 13c

The sectional area of the first core 13a may be the same as that of the third core 13c or may be different from each other. More specifically, when it is assumed that the wavelength of light to be used are $\lambda 1$, $\lambda 2$, $\lambda 3$ ($\lambda 1 < \lambda 2 < \lambda 3$, for example, $\lambda 1 = 1.31$ μm, $\lambda 2 = 1.49$ μm, $\lambda 3 = 1.55$ μm), the second core 13b is a single-mode core for the light of the wavelength $\lambda 3$, and it is a multiple-mode core for the light of the wavelengths $\lambda 1$ and $\lambda 2$. The first and third cores 13a and 13c are single-mode cores for any light of the wavelengths $\lambda 1$, $\lambda 2$ and $\lambda 3$ (that is, when it is assumed that cut-off wavelengths of the cores 13a and 13c are $\lambda a$ and $\lambda c$, and a cut-off wavelength of the core 13b is $\lambda b$, the following relation is provided, that is, $\lambda a$, $\lambda c < \lambda 1 < \lambda 2 < \lambda b < \lambda 3$).

The filter element 15 of this embodiment has characteristics of short-wavelength band transmission type, which makes the light of the wavelengths $\lambda 1$ and $\lambda 2$ transmit therethrough but makes the light of the wavelength $\lambda 3$ reflect therefrom. In addition, the position of the filter element 15 is adjusted in the groove 16 such that light loss in each of the cores 13a, 13b and 13c may be a minimum.

The end face of the first core 13a is coupled to the optical fiber 17a, the end face of the second core 13b is coupled to the optical fiber 17b, and the end face of the third core 13c is coupled to the optical fiber 17c. The optical fibers 17a, 17b and 17c are positioned so as to fit in V-shaped grooves 19 provided in the upper face of the silicon substrate 18, and the end faces of the optical fibers 17a, 17b and 17c are opposed to the cores 13a, 13b and 13c, respectively. An upper face of each of the optical fibers 17a and 17b fit in the V-shaped grooves 19 is pressed by a cover 20a made of glass or plastic, and the optical fiber 17c is also pressed by a cover 20b made of glass or plastic. Each of the covers 20a and 20b is bonded onto the upper face of the silicon substrate 18 by an adhesive agent 21.

Figure 7:
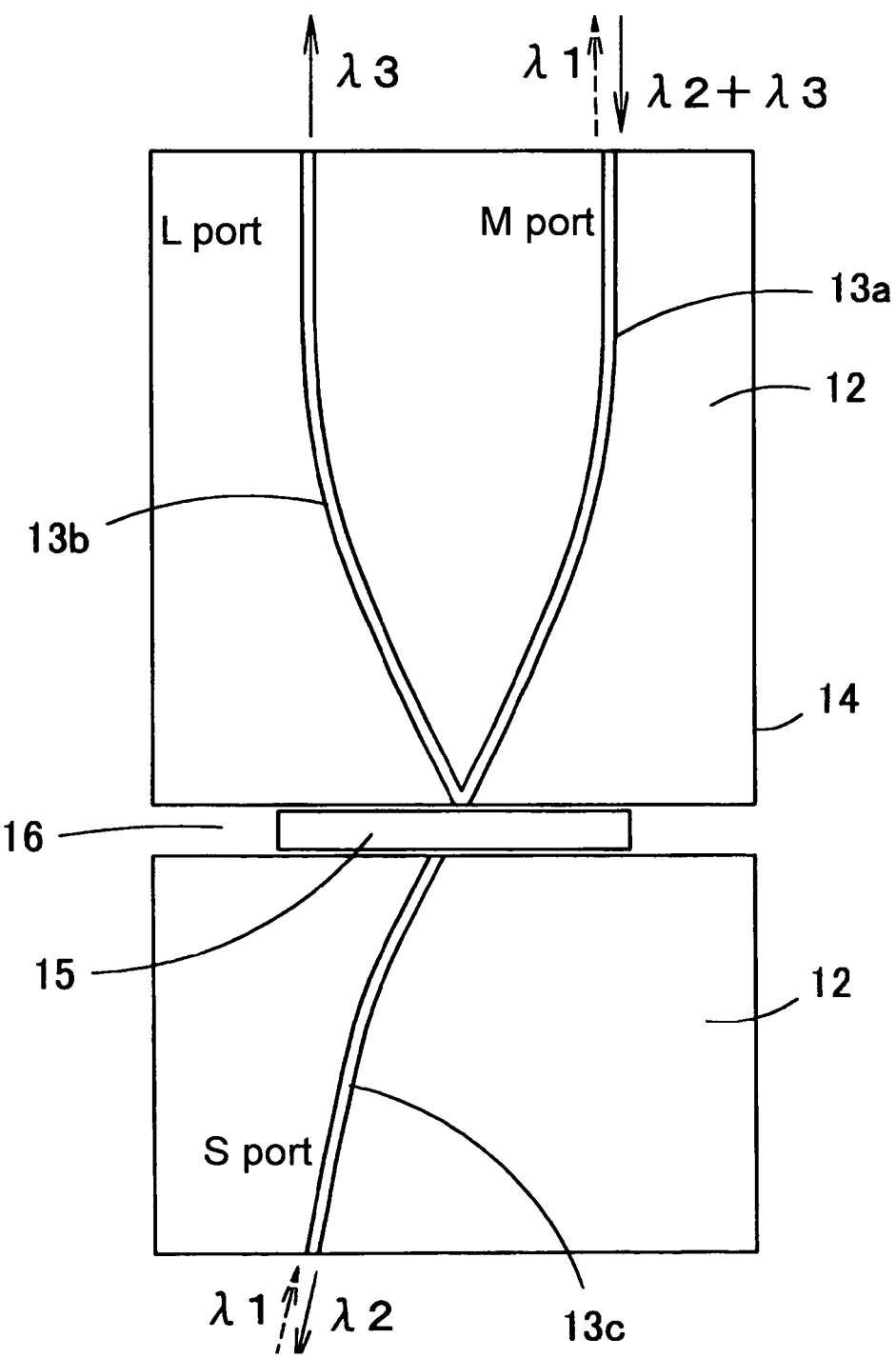
FIG. 7 shows dividing operations of the optical multiplexer/demultiplexer.

In the case where the optical multiplexer/demultiplexer 11 is used for dividing light, as shown by arrows of solid line in FIG. 7, when the light of the wavelength $\lambda 2$ and the light of the wavelength $\lambda 3$ are simultaneously made incident from the optical fiber 17a onto the core 13a (M port), they are propagated in the core 13a and emitted from the end face of the core 13a and, then, the light of the wavelength $\lambda 3$ is reflected from the filter element 15, is propagated in the core 13b (L port) and is coupled to the optical fiber 17b, while the light of the wavelength $\lambda 2$ transmits through the filter element 15, is propagated in the core 13c (S port) and is coupled to the optical fiber 17c. When the light of the wavelength $\lambda 2$ and the light of the wavelength $\lambda 3$ are simultaneously made incident onto the core 13a, even if a part of the light of the wavelength $\lambda 2$ enters the core 13b side from the end of the core 13a, since the core 13b is in the multiple mode for the light of the wavelength $\lambda 2$, it is not coupled to the single-mode optical fiber 17b. As a result, noise caused when the light of the wavelength $\lambda 2$ is made incident from the core 13b onto the optical fiber 17b is not generated.

In addition, as shown by arrows of broken line in FIG. 7, when the light of the wavelength $\lambda 1$ is made incident from the optical fiber 17c onto the core 13c, the light is propagated in the core 13c, is emitted from its end face, transmits through the filter element 15, is made incident onto the core 13a, is propagated in the core 13a and is coupled to the optical fiber 17a. In addition, even when a part of the light of the wavelength $\lambda 1$ enters core 13b after transmitting through the filter element 15, since the core 13b is in the multiple mode for the light of the wavelength $\lambda 1$, it is not coupled to the single-mode optical fiber 17b and noise caused when the light of the wavelength $\lambda 1$ is made incident from the core 13b onto the optical fiber 17b is not generated.

Figure 8:
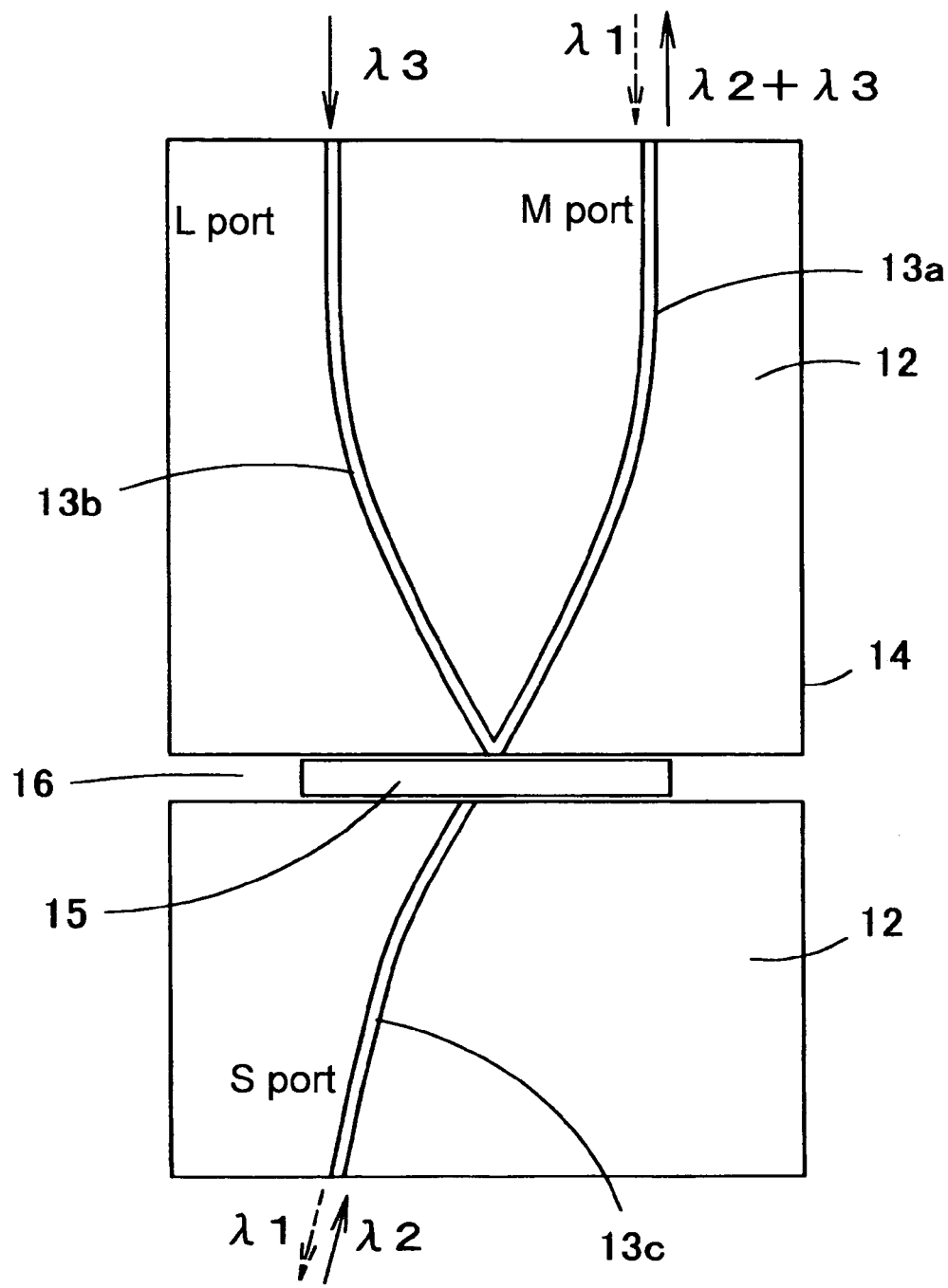
FIG. 8 shows combining operations of the optical multiplexer/demultiplexer.

In the case where the optical multiplexer/demultiplexer 11 is used for combining light, as shown by arrows of solid line in FIG. 8, when the light of the wavelength $\lambda 2$ is made incident from the optical fiber 17c onto the core 13c and the light of the wavelength $\lambda 3$ is made incident from the optical fiber 17b onto the core 13b, the light of the wavelength $\lambda 2$ emitted from the core 13c transmits through the filter element 15 and enters the core 13a, while the light of the wavelength $\lambda 3$ emitted from the core 13b is reflected from the filter element 15 and enters the core 13a, so that the light of the wavelength $\lambda 2$ and the light of the wavelength $\lambda 3$ are combined in the filter element 15 and the combined light is propagated in the core 13a to be coupled to the optical fiber 17a. In addition, even when a part of the light of the wavelength $\lambda 2$ enters the core 13b side after transmitting through the filter element 15, since the core 13b is in the multiple mode for the light of the wavelength $\lambda 2$, it is not coupled to the single-mode optical fiber 17b, so that the light of the wavelength $\lambda 2$ is prevented from being made incident from the core 13b onto the optical fiber 17b and becoming noise light.

In addition, as shown by arrows of broken line in FIG. 8, when the light of the wavelength $\lambda 1$ is made incident from the optical fiber 17a onto the core 13a, the light emitted from the core 13a transmits through the filter element 15, is made incident onto the core 13c, is propagated in the core 13c and is coupled to the optical fiber 17c. In addition, even when a part of the light of the wavelength $\lambda 1$ enters the core 13b side after being propagated in the core 13a, since the core 13b is in the multiple mode for the light of the wavelength λ1, it is not coupled to the single-mode optical fiber 17b, so that the light of the wavelength λ1 is prevented from being made incident from the core 13b onto the optical fiber 17b and becoming stray light.

Figure 9:
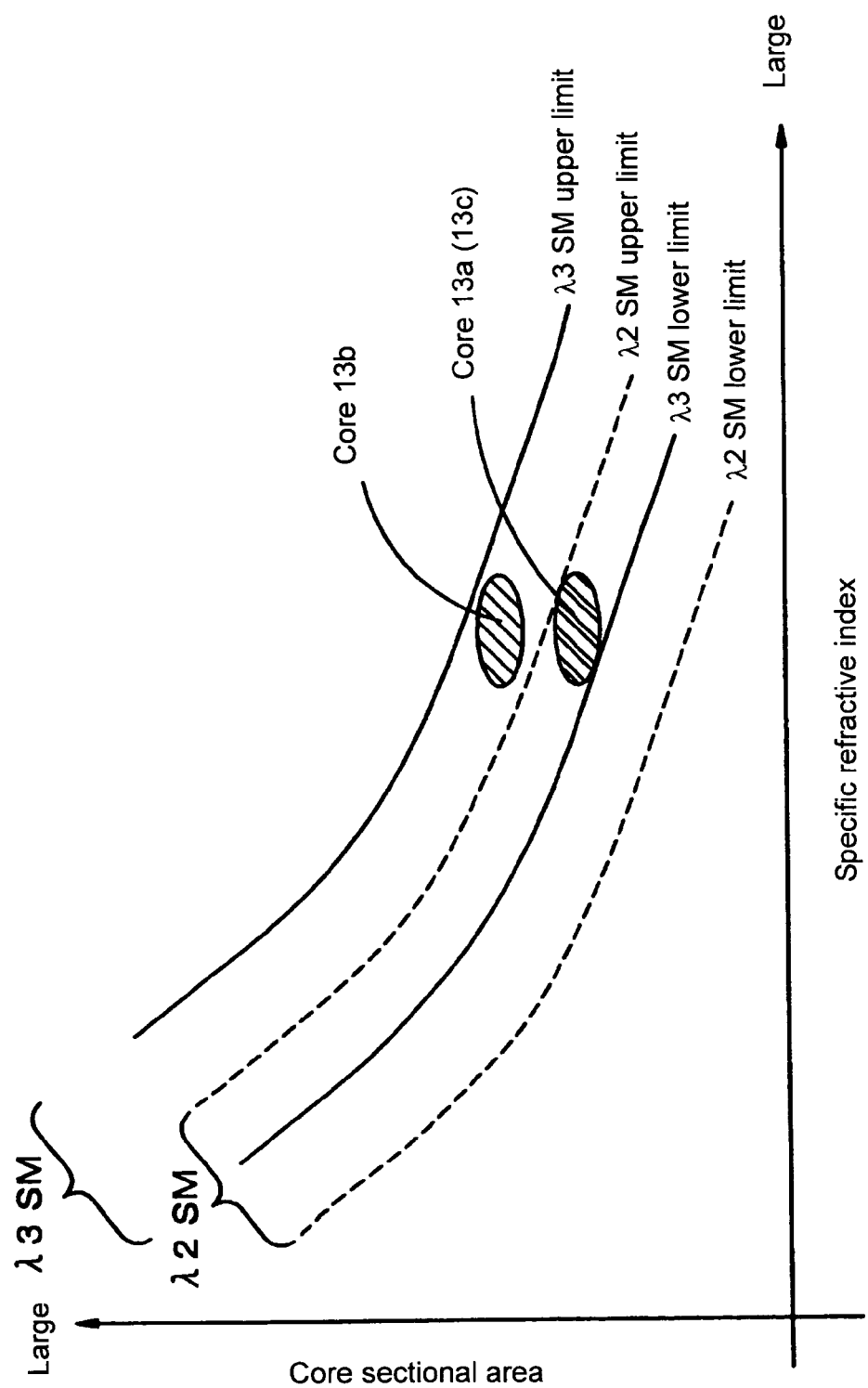
FIG. 9 shows a region where a core becomes a single mode in a two-dimensional plane consisting of a specific refractive index difference and a core sectional area.

FIG. 9 shows a graph of a range in which the core becomes the single mode for the light of the wavelength λ3 and a range in which the core becomes the single mode for the light of the wavelength λ2, in a two-dimensional region consisting of a core sectional area and specific refractive index of the core. A region sandwiched by two solid lines (SM upper limit of λ3 and SM lower limit of λ3) corresponds to the range (SM of λ3) in which the core becomes the single mode for the light of the wavelength λ3, and a region sandwiched by two broken lines (SM upper limit of λ2 and SM lower limit of λ2) corresponds to the range (SM of λ2) in which the core becomes the single mode for the light of the wavelength λ2. Although description is not made of the wavelength λ1, it may be considered to be similar to the wavelength λ2. Therefore, when the second core 13b is designed such that it may be out of the range of the single mode of the wavelength λ2 (and λ1) and may be within the range of the single mode of the wavelength λ3, it can be in the single mode for the light of the wavelength λ3 and be in the multiple mode for the light of the wavelength λ1 and the wavelength λ2. In addition, when the first and third cores 13a and 13c are designed such that they may be within the range of the single mode of the wavelength λ3 and the wavelength λ2 (and λ1), it can be the core in the single mode for the light of the wavelengths λ1, λ2 and λ3. Especially, when it is assumed that the specific refractive index of each of the cores 13a, 13b and 13c is equal to each other, the cores 13a, 13b and 13c are to be designed so that they may be within regions in which hatchings are provided in FIG. 9. In order to implement the above, it can be understood that the sectional area of the second core 13b should be smaller than that of the first core 13a and that of the third core 13c.

Figures 10A, 10B, 10C:
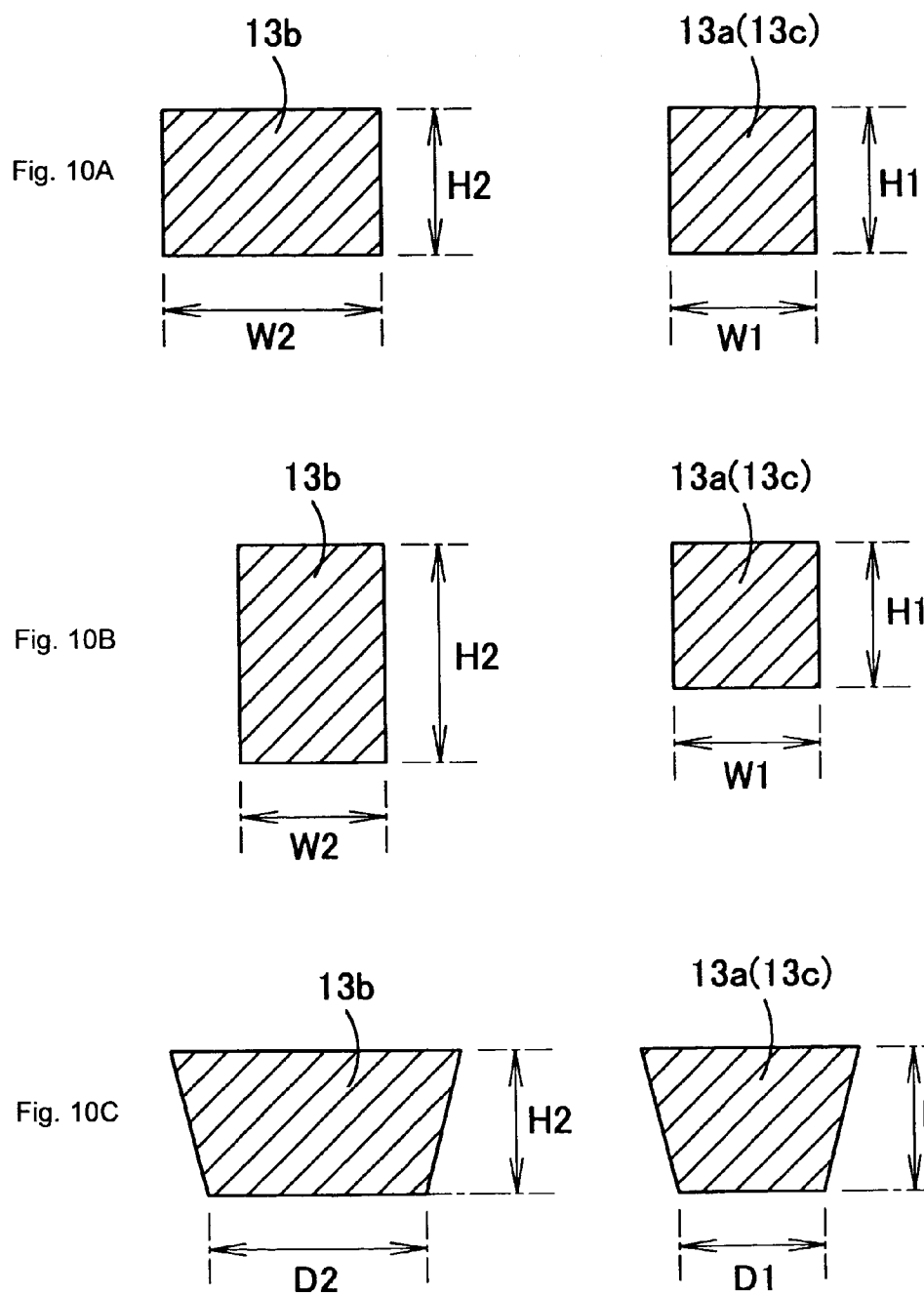
FIGS. 10A to 10C show a method of making a sectional area of a second core larger than those of other cores, respectively.

FIG. 10 shows several examples of a method of providing the sectional area of the core 13b so as to be larger than those of the cores 13a and 13c. According to the example shown in FIG. 10A, the core section is rectangular, and a height H2 of the core 13b and a height H1 of each of the cores 13a and 13c are made equal to each other and a width W2 of the core 13b is made larger than a width W1 of each of the cores 13a and 13c (H2=H1, W2>W1). According to the example shown in FIG. 10B, the width W2 of the core 13b and the width W1 of each of the cores 13a and 13c are made equal to each other and the height H2 of the core 13b is made larger than the height H1 of each of the cores 13a and 13c (W2=W1, H2>H1). Furthermore, according to the example shown in FIG. 10C, the core section is made to be a trapezoid in which its lower part is narrower (in this configuration, the core is easily formed), the height H2 of the core 13b and the height H1 of each of the cores 13a and 13c are made equal to each other and a lower width D2 of the core 13b is made larger than a lower width D1 of each of the cores 13a and 13c (H2=H1, D2>D1). Alternatively, in the core having the trapezoidal section shown in FIG. 10C, a width of a central part or the height may be differentiated. Here, although other examples are omitted, it is needless to say that various kinds of methods can be implemented depending on the configuration of the core section.

The method of designing the core section will be further described in detail. That is, as shown in FIG. 9, according to the single mode and the multiple mode, the mode is not abruptly changed from the single mode to the multiple mode at a certain core sectional area (core diameter), and there is a transition region where the mode is gradually transited from the single mode to the multiple mode, between the single mode of 100% and the multiple mode of 100%. Therefore, when the second core 13b becomes the single-mode core for the light of the wavelength λ3 and becomes the multiple-mode core for the light of the wavelengths λ1 and λ2, it does not necessarily become the single-mode core 100% for the light of the wavelength λ3 nor become the multiple-mode core 100% for the light of the wavelengths λ1 and λ2.

Figure 11:
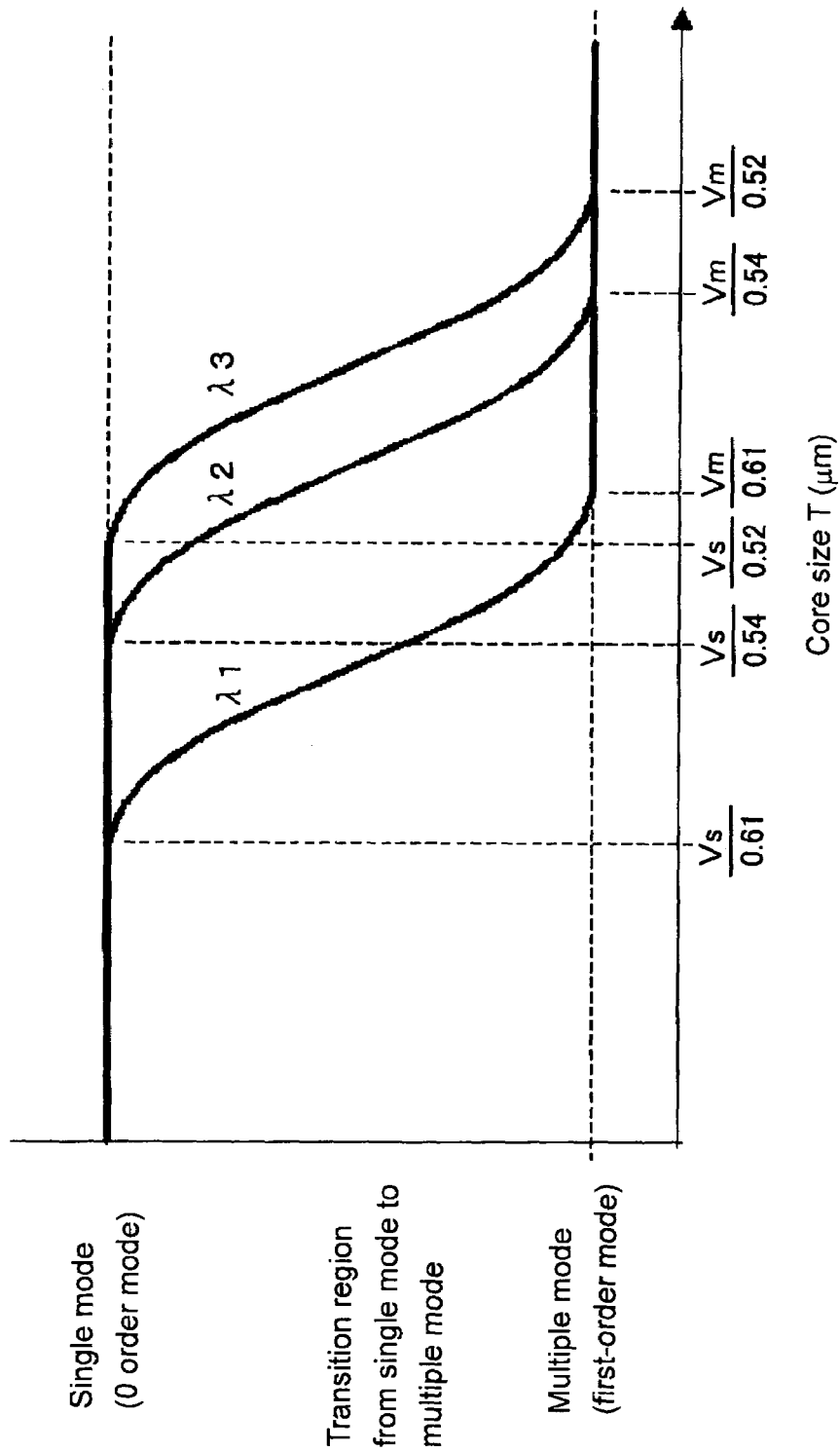
FIG. 11 shows a relation between a core size and a mode of the core (single mode/multiple mode) in the cases of wavelengths λ1, λ2 and λ3.

FIG. 11 shows a view of a relation between a size of the core section (core size) and a propagation mode of the core, in which a lateral axis shows a core size T. As shown in FIG. 11, when the core size is sufficiently large, the core is in multiple mode for all of the wavelengths λ1, λ2 and λ3 (100%). When the core size becomes as small as Vm/0.52 (herein, Vm designates a standardized frequency in which the core becomes the multiple mode), the mode enters the transition region for the wavelength λ3 (=1.55 μm) and gradually becomes the single mode. When the cores size becomes Vs/0.52 (herein, Vs designates a standardized frequency in which the core becomes the single mode), the mode becomes the single mode 100%. Similarly, when the core size becomes as small as Vm/0.54, the mode enters the transition region for the wavelength λ2 (=1.49 μm) and gradually becomes the single mode. When the cores size becomes Vs/0.54, the mode becomes the single mode 100%. In addition, when the core size becomes as small as Vm/0.61, the mode enters the transition region for the wavelength λ1 (=1.31 μm) and gradually becomes the single mode. When the cores size becomes Vs/0.61, the mode becomes the single mode 100%.

Here, description will be made of a relation between the core size T and the degree of the single mode or the multiple mode shown in FIG. 11. When it is assumed that the core size (thickness of the core) is T, an refractive index of the core is nf, and a refractive index of the clad is ns, a standardized frequency V for the light of the wavelength λ is expressed by the following equation (1). (Hiroshi Nishihara, Masamitsu Haruna and Toshiaki Suhara, "Optical Integrated Circuit", first edition, published by Ohmsha, Ltd., Apr. 20 in 1987, pp. 14–18)

$$V = \frac{2\pi T}{\lambda}\sqrt{nf^2 - ns^2} \qquad (1)$$

Therefore, when the core size is found by the above equation (1), the next equation (2) can be obtained.

$$T = \frac{\lambda V}{2\pi\sqrt{nf^2 - ns^2}} \qquad (2)$$

Here, it is assumed that the refractive index nf of the core is 1.4556 μm, and the refractive index ns of the clad is 1.45 μm. In addition, when it is assumed that a standardized waveguide refractive index (see the above document) is constant, the single-mode standardized frequency V and the multiple-mode standardized frequency V are constant regardless of the wavelength of the light. Thus, the standardized frequency in which the single mode is implemented is designated by Vs and the standardized frequency in which the multiple mode is implemented is designated by Vm.

Thus, when values of the refractive indexes nf and ns are assigned to the equation (2) and the standardized frequency V is replaced with the single-mode standardized frequency Vs, the core size Ts in which the core becomes the single mode is expressed by the following equation (3). Similarly, when values of the refractive indexes nf and ns are assigned to the equation (2) and the standardized frequency V is replaced with the multiple-mode standardized frequency Vm, the core size Tm in which the core becomes the multiple mode is expressed by the following equation (4).

$$Ts = \frac{\lambda Vs}{0.802} \quad (3)$$

$$Tm = \frac{\lambda Vm}{0.802} \quad (4)$$

Thus, when it is assumed that the wavelength $\lambda 1$ is 1.31 μm and the value is assigned to the above equations (3) and (4), the core size Ts in which the single mode is implemented is Vs/0.61 (μm) from the equation (3), the core size Tm in which the multiple mode is implemented is Vm/0.61 (μm) from the equation (4) and the transition region from the multiple mode to the single mode is provided between Vs/0.61 and Vm/0.61. Similarly, when it is assumed that the wavelength $\lambda 2$ is 1.49 μm and the value is assigned to the above equations (3) and (4), the core size Ts in which the single mode is implemented is Vs/0.54 (μm) from the equation (3), the core size Tm in which the multiple mode is implemented is Vm/0.54 (μm) from the equation (4) and the transition region from the multiple mode to the single mode is provided between Vs/0.54 and Vm/0.54. In addition, when it is assumed that the wavelength $\lambda 3$ is 1.55 μm and the value is assigned to the above equations (3) and (4), the core size Ts in which the single mode is implemented is Vs/0.52 (μm) from the equation (3), the core size Tm in which the multiple mode is implemented is Vm/0.52 (μm) from the equation (4) and the transition region from the multiple mode to the single mode is provided between Vs/0.52 and Vm/0.52. FIG. 11 shows the above.

Therefore, according to the second core 13b, the core size should be larger than Vs/0.54 and smaller than Vm/0.52. In addition, according to the first and third cores 13a and 13c, the core size should be smaller than Vm/0.61. However, it is to be noted that the core size of the second core 13b is larger than the core sizes of the first core 13a and the third core 13c on the lateral axis shown in FIG. 11.

Thus, according to the optical multiplexer/demultiplexer 11 of the present invention, when it is used for combining/dividing the light, noise in the optical fiber 17b connected to the second core 13b can be reduced by enhancing isolation between the first core 13a and the second core 13b. In addition, bend loss of light propagated in the second core 13b can be reduced. Therefore, since it is not necessary to increase curvature of the core unlike the conventional method in which a branching angle between cores is increased, it can be avoided that the required positional precision of the filter element 15 becomes strict or the cost is increased because the optical multiplexer/demultiplexer becomes large.

Figure 1:
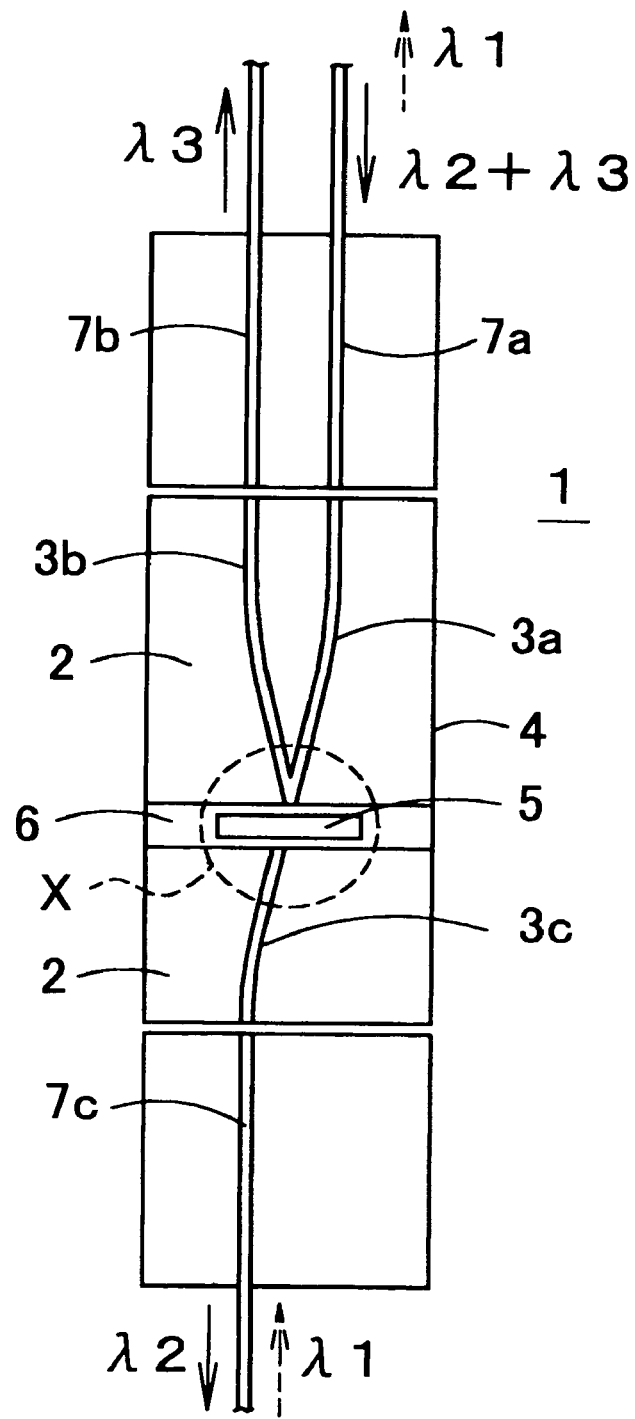
FIG. 1 shows a horizontal sectional view of a structure of a conventional optical multiplexer/demultiplexer using a dielectric multilayer filter.
Figure 2:
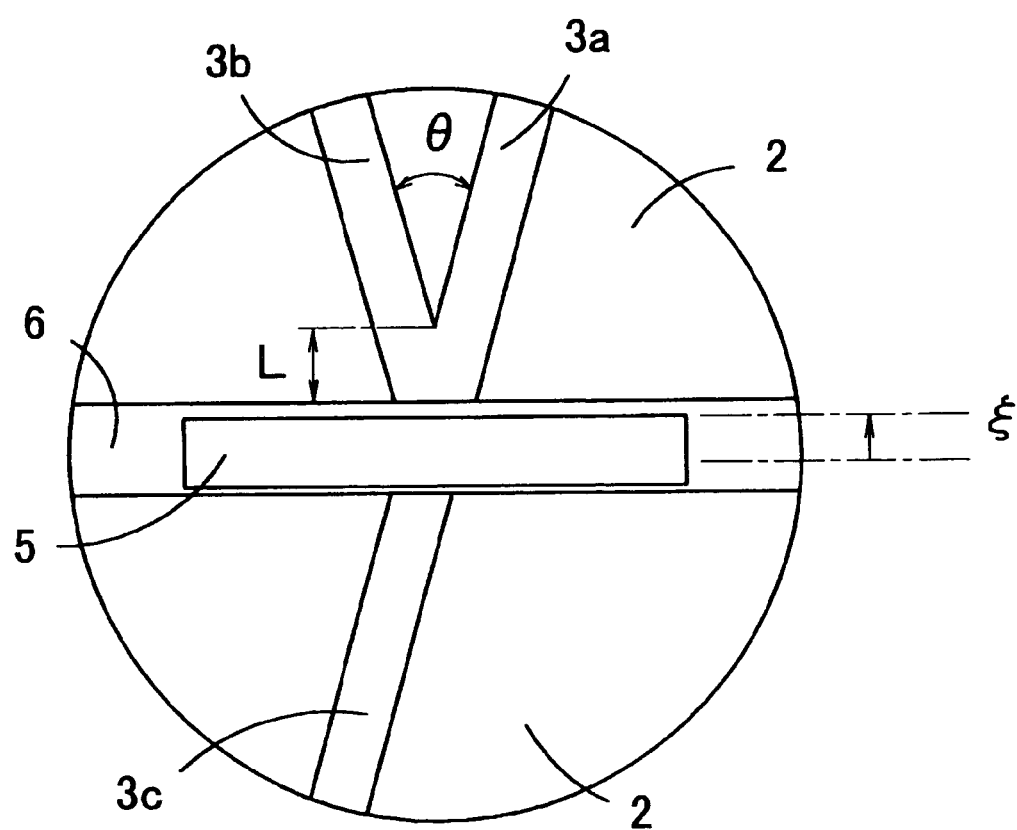
FIG. 2 shows an enlarged view of an X part in FIG. 1.
Figure 3:
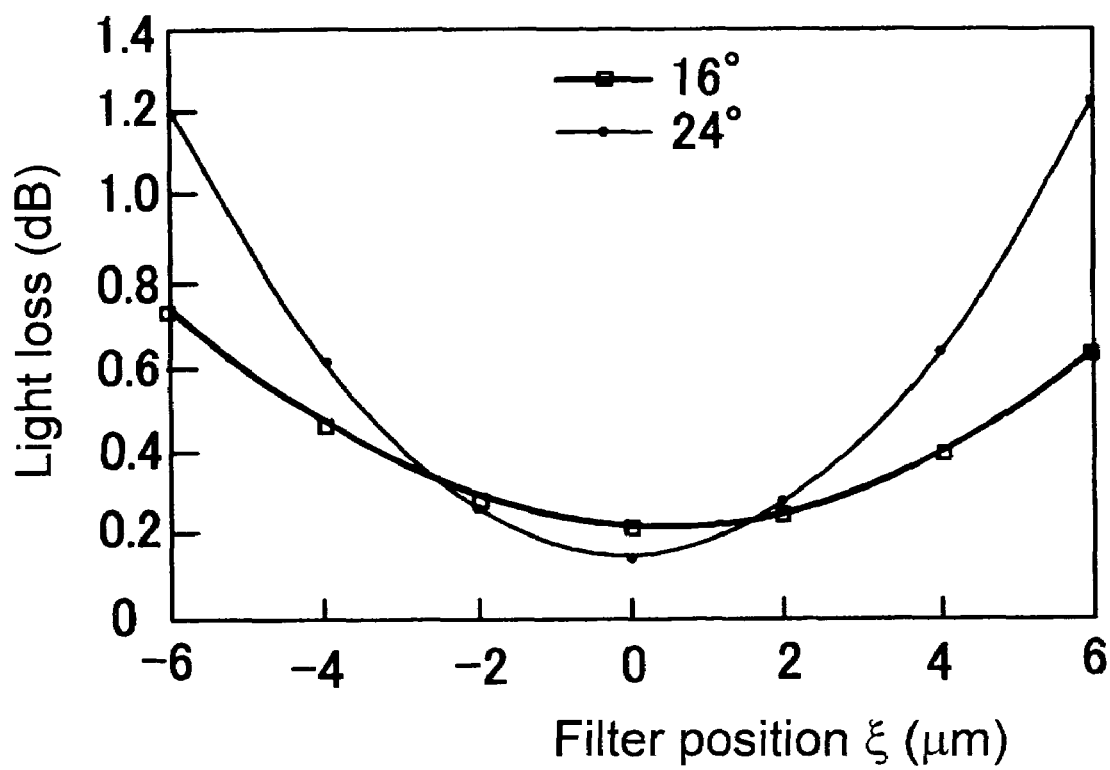
FIG. 3 shows a relation between a filter position and a light loss after the light transmits through the filter in the case where the branching angles between cores is 16° and 24°.

FIGS. 12A1, 12B1, 12C1, 13D1, 13E1, 13F1, 13G1, 14H1, 14I1 and 14J1 show perspective views of manufacturing steps of the optical multiplexer/demultiplexer 11, and FIGS. 12A2, 12B2, 12C2, 13D2, 13E2, 13F2, 13G2, 14H2, 14I2 and 14J2 show sectional views thereof. FIGS. 12A2, 12B2, 12C2, 13D2, 13E2, 13F2, 13G2, 14H2, 14I2 and 14J2 show cross sections of FIGS. 12A1, 12B1, 12C1, 13D1, 13E1, 13F1, 13G1, 14H1, 14I1 and 14J1, respectively. When the optical multiplexer/demultiplexer 11 is manufactured, as shown in FIGS. 12A1 and 12A2, a UV cure resin 23 is delivered by drops onto a glass substrate 22; a stamper 24 is overlapped with the UV cure resin 23; and the stamper 24 is pressed to spread the UV cure resin 23 between the glass substrate 22 and the stamper 24. Then, as shown in FIGS. 12B1 and 12B2, the UV cure resin 23 is irradiated with UV through the glass substrate 22 so that the UV cure resin 23 is cured. Since an approximate Y-shaped pattern 25 protrudes from a lower surface of the stamper 24, when the stamper 24 is separated from the UV cure resin 23 after curing of the UV cure resin 23, as shown in FIGS. 12C1 and 12C2, the lower clad 12b is formed by the UV cure resin 23 on the upper surface of the glass substrate 22 and a plurality of approximate Y-shaped concave parts 26 are formed in the upper surface of the lower clad 12b.

Then, a resin having a refractive index higher than that of the lower clad 12b is filled in the concave parts 26 in the lower clad 12b and, as shown in FIGS. 13D1 and 13D2, the core 13 is formed in the concave part 26. Then, as shown in FIGS. 13E1 and 13E2, the same UV cure resin 23 is delivered by drops onto the lower clad 12b as that of the lower clad and, as shown in FIGS. 13F1 and 13F2, a glass substrate 27 is overlapped with the UV cure resin 23 and pressed against it. Then, the UV cure resin 23 is irradiated with UV through the glass substrate 27 so that the UV cure resin 23 is cured and an upper clad 12a is formed of the UV cure resin 23. As a result, the upper and lower clads 12a and 12b in which the plural cores 13 are formed are formed between the upper and lower glass substrates 27 and 22.

Then, as shown in FIGS. 13G1 and 13G2, the optical waveguide wafer formed as described above is cut every core 13 by a dicing saw, and the optical waveguides 14 are provided as shown in FIGS. 14H1 and 14H2. At this time, it is desirable that the end face of each core 13 is exposed. Furthermore, as shown in FIGS. 14I1, 14I2, 14J1 and 14J2, the glass substrate 27 is cut by the dicing saw from the above to form a groove 16 and to divide the core 13 into the cores 13a and 13b, and the core 13c. Then, the filter element 15 is inserted in the groove 16 to provide the optical multiplexer/demultiplexer 11.

The optical multiplexer/demultiplexer 11 provided as described above is mounted on the silicon substrate 18 after the upper and lower glass substrates 27 and 22 were separated (the glass substrates 27 and 22 may be kept attached as it is).

Although the description is made of the method of manufacturing the optical waveguide by a duplication method using the stamper and the UV cure resin, the manufacturing method is not limited to this and it may be manufactured by injection molding or a mechanical processing method.

(Second Embodiment)

Figure 15:
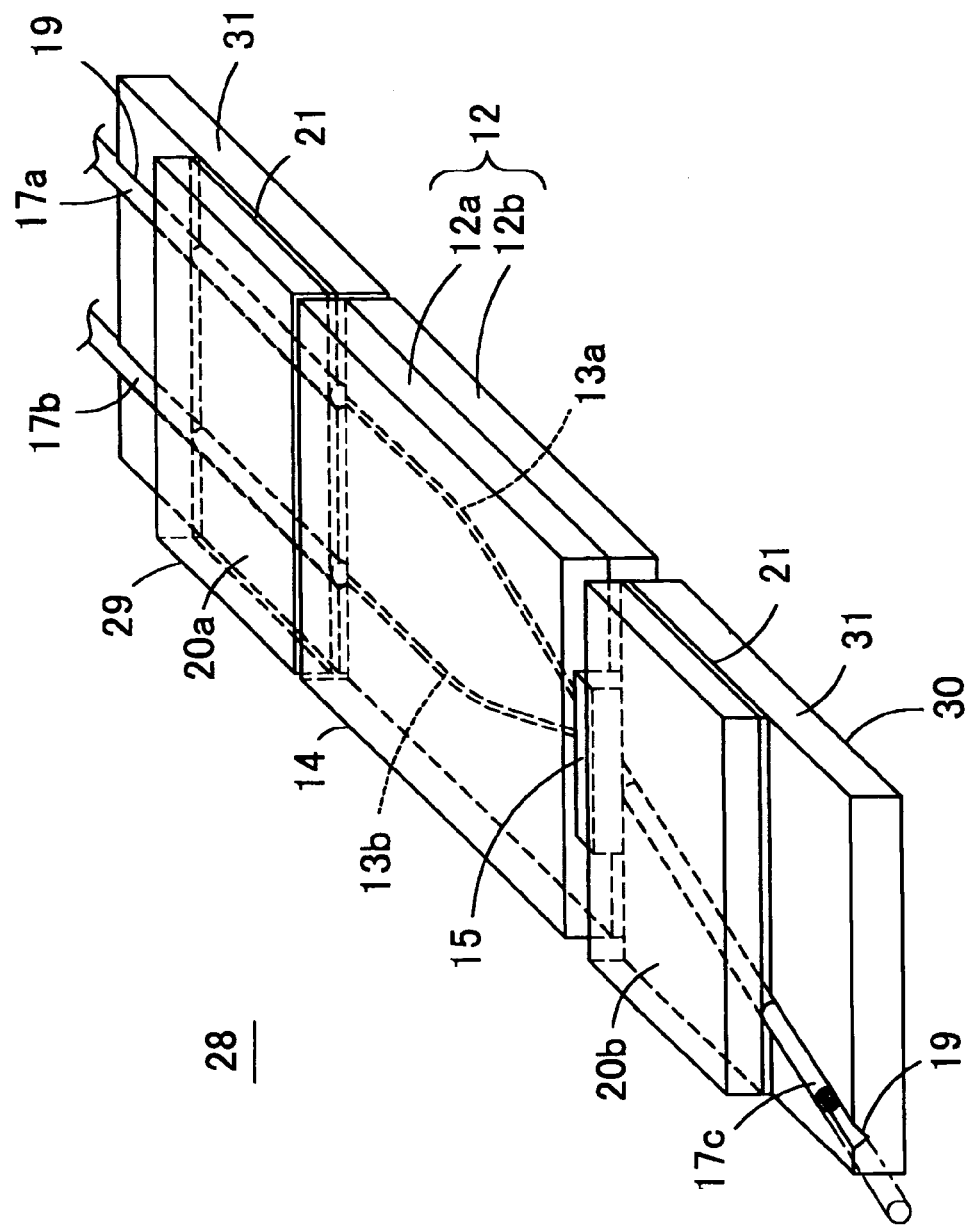
FIG. 15 shows a perspective view of an optical multiplexer/demultiplexer according to a second embodiment of the present invention.

FIG. 15 shows a perspective view of an optical multiplexer/demultiplexer 28 (WDM coupler) according to a second embodiment of the present invention. The optical multiplexer/demultiplexer 28 has a structure in which the third core 13c in the optical waveguide 14 in the optical multiplexer/demultiplexer 11 according to the first embodiment is removed. That is, according to the optical multiplexer/demultiplexer 28, a first core 13a and a second core 13b are buried in a clad 12, end faces of the cores 13a and 13b are exposed at both end faces of the clad 12, and the first and second cores 3a and 3b are connected in approximate V-shape at one end of the clad 12. A filter element 15 is provided at the end face of the clad 12 where the cores 13a and 13b are connected in the approximate V-shape, and the end faces of the first and second cores 13a and 13b are opposed to the filter element 15.

Optical fiber blocks 29 and 30 are connected to both ends of the optical waveguide 14. According to the optical fiber block 29, optical fibers 17a and 17b are put on a V-shaped groove 19 provided in the glass substrate 31, an upper surface thereof is pressed by a cover 20a made of glass or plastic, and the cover 20a is bonded to the glass substrate 31 by an adhesive agent 21. Similarly, according to the optical fiber block 30, an optical fiber 17c is put on the V-shaped groove 19 provided in the glass substrate 31, an upper surface thereof is pressed by a cover 20b made of glass or plastic, and the cover 20b is bonded to the glass substrate 31 by the adhesive agent 21. The optical fiber block 29 is connected to one end face of the optical waveguide 14 so as to couple the optical fiber 17a to the end face of the first core 13a and couple the optical fiber 17b to the end face of the second core 13b. In addition, the optical fiber block 30 is connected to the other end face of the optical waveguide 14 through the filter element 15 so as to couple the optical fiber 17c to the end face of the third core 13c.

In addition, the optical waveguide 14 has the following relation:

Sectional area of the second core 13b>sectional area of the first core 13a

That is, when it is assumed that the wavelengths of light to be used are $\lambda 1$, $\lambda 2$, $\lambda 3$ ($\lambda 1 < \lambda 2 < \lambda 3$, for example, $\lambda 1 = 1.31$ μm, $\lambda 2 = 1.49$ μm, $\lambda 3 = 1.55$ μm), the second core 13b is a single-mode core for the light of the wavelength $\lambda 3$, and it is a multiple-mode core for the light of the wavelengths $\lambda 1$ and $\lambda 2$. The first core 13a is a single-mode core for any light of the wavelengths $\lambda 1$, $\lambda 2$ and $\lambda 3$ (that is, when it is assumed that a cut-off wavelength of the cores 13a is $\lambda a$, and a cut-off wavelength of the core 13b is $\lambda b$, the following relation is provided, that is, $\lambda a < \lambda 1 < \lambda 2 < \lambda b < \lambda 3$).

Figure 16:
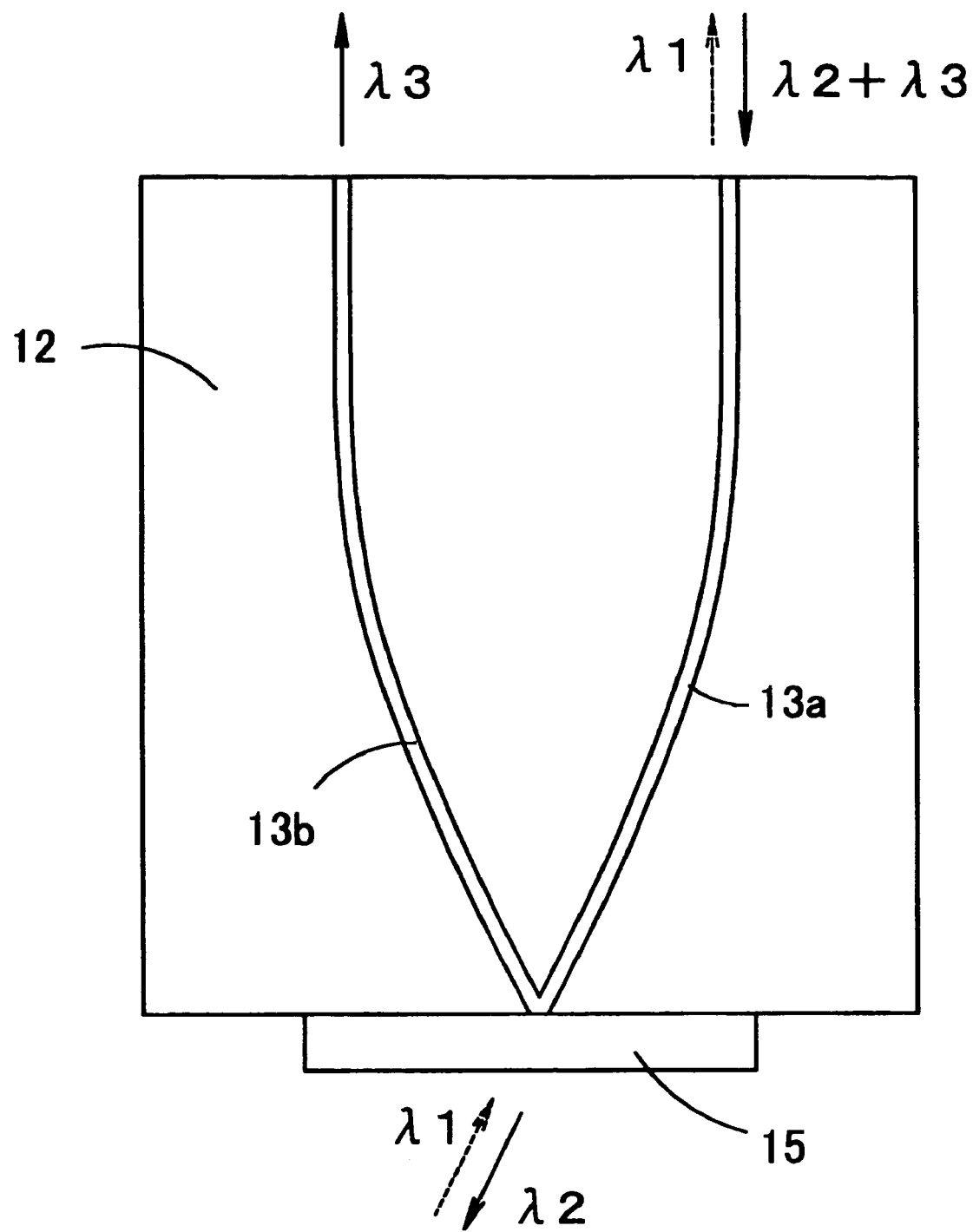
FIG. 16 shows dividing operations of the optical multiplexer/demultiplexer.

Thus, according to the optical multiplexer/demultiplexer 28, as shown by arrows of solid line in FIG. 16, when the light of the wavelength $\lambda 2$ and the light of the wavelength $\lambda 3$ are simultaneously made incident from the optical fiber 17a to the core 13a, they are propagated in the core 13a and emitted from the end face of the core 13a and, then, the light of the wavelength $\lambda 3$ is reflected from the filter element 15, is made incident onto the core 13b, is propagated in the core 13b and is coupled to the optical fiber 17b, while the light of the wavelength $\lambda 2$ transmits through the filter element 15 and is coupled to the optical fiber 17c. When the light of the wavelength $\lambda 2$ and the light of the wavelength $\lambda 3$ are simultaneously made incident onto the core, even if a part of the light of the wavelength $\lambda 2$ is enters the core 13b side at the end of the core 13a, since the core 13b is in the multiple mode for the light of the wavelength $\lambda 2$, it is not coupled to the single-mode optical fiber 17b. As a result, noise caused when the light of the wavelength $\lambda 2$ is made incident from the core 13b onto the optical fiber 17b is not generated.

In addition, as shown by arrows of broken line in FIG. 16, when the light of the wavelength $\lambda 1$ is emitted from the optical fiber 17c, the emitted light transmits through the filter element 15, is made incident onto the core 13a, is propagated in the core 13a and is coupled to the optical fiber 17a. In addition, even when a part of the light of the wavelength $\lambda 1$ enters the core 13b side after transmitting through the filter element 15, since the core 13b is also in the multiple mode for the light of the wavelength $\lambda 1$, it is not coupled to the single-mode optical fiber 17b and noise caused when the light of the wavelength $\lambda 1$ is made incident from the core 13b onto the optical fiber 17b is not generated.

In addition, since the sectional area of the second core 13b is larger, bend loss of the wavelength $\lambda 3$ propagated in the second core 13b is reduced, which is the same as in the first embodiment.

(Third Embodiment)

Figure 17:
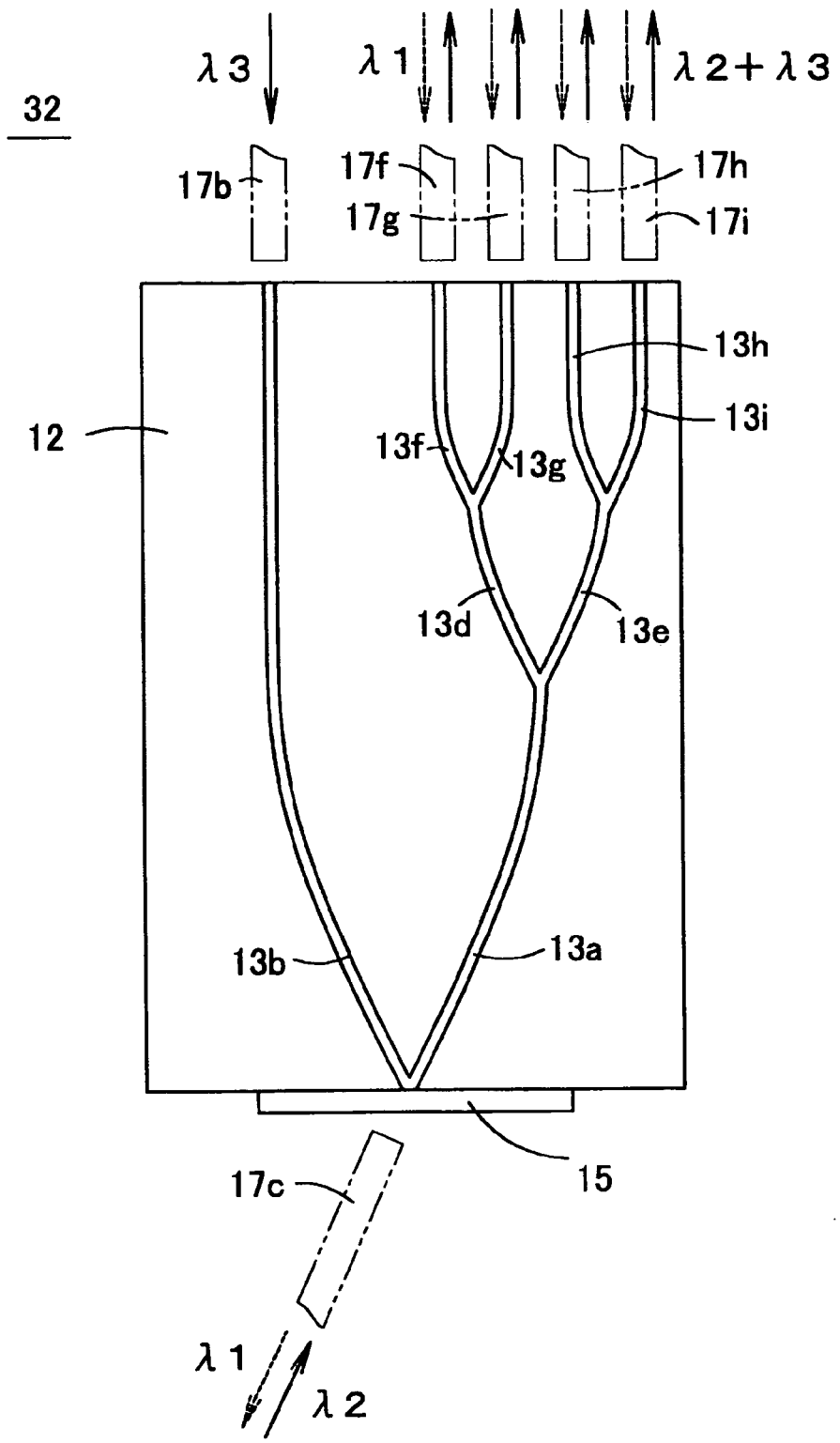
FIG. 17 shows a horizontal sectional view of an optical multiplexer/demultiplexer according to a third embodiment of the present invention.

FIG. 17 shows an optical multiplexer/demultiplexer 32 comprising a four-branching coupler according to a third embodiment of the present invention. According to the optical multiplexer/demultiplexer 32, a first core 13a and a second core 13b which are buried in a clad 12 are connected in approximate V-shape at one end of the clad 12. The core 13a branches off in two cores 13d and 13e, the core 13d branches off in two cores 13f and 13g, and the core 13e branches off in two cores 13h and 13i. In addition, a filter element 15 is bonded to the end face of the clad 12 on which the cores 13a and the core 13b are connected.

Although it is not shown, optical fiber blocks are connected to both ends of an optical waveguide 14, respectively. The optical fiber block connected to the side of the filter element 15 comprises an optical fiber 17c which is optically connected to the core 13a through the filter element 15. In addition, the optical fiber block connected to the other side thereof comprises five optical fibers 17b, 17f, 17g, 17h and 17i which are connected to the cores 13b, 13f, 13g, 13h and 13i, respectively.

According to the optical multiplexer/demultiplexer 32, sectional areas of the cores 13a and 13d to 13i are equal to one another, and the sectional area of the second core 13b is larger than the sectional areas of the cores 13a and 13d to 13i. When it is assumed that the wavelengths of light to be used are $\lambda 1$, $\lambda 2$, $\lambda 3$ ($\lambda 1 < \lambda 2 < \lambda 3$, for example, $\lambda 1 = 1.31$ μm, $\lambda 2 = 1.49$ μm, $\lambda 3 = 1.55$ μm), the second core 13b is a single-mode core for the light of the wavelength $\lambda 3$ and it is a multiple-mode core for the light of the wavelengths $\lambda 1$ and $\lambda 2$. The core 13a and cores 13d to 13i are single-mode cores for the light of the wavelengths $\lambda 1$, $\lambda 2$ and $\lambda 3$ (that is, when it is assumed that a cut-off wavelength of the cores 13a and 13d to 13i is $\lambda a$, and a cut-off wavelength of the core 13b is $\lambda b$, the following relation is provided, that is, $\lambda a < \lambda 1 < \lambda 2 < \lambda b < \lambda 3$).

Thus, according to the optical multiplexer/demultiplexer 32, as shown by arrows of solid line in FIG. 17, when the light of the wavelength $\lambda 3$ is made incident from the optical fiber 17b onto the core 13b and the light of the wavelength $\lambda 2$ is made incident from the optical fiber 17c connected to the filter element, the light of the wavelength $\lambda 3$ and the light of the wavelength $\lambda 2$ are combined at the filter element 15, and the combined light is propagated in the core 13a, is branched off in the cores 13d and 13e, and is further branched off in the cores 13f and 13g and the cores 13h and 13i. The light emitted from cores 13f to 13i is coupled to the optical fibers 17f to 17i, respectively. In addition, even if a part of the light of the wavelength $\lambda 2$ transmitted through the filter element 15 enters the core 13b side, since the core 13b is in the multiple mode for the light of the wavelength $\lambda 2$, the light is not coupled to the single-mode optical fiber 17b. Since the light of the wavelength $\lambda 2$ is not made incident from the core 13b onto the optical fiber 17b, it does not become stray light.

In addition, as shown by arrows of broken lines in FIG. 17, when the light of the wavelength $\lambda 1$ is made incident from the optical fibers 17f to 17i onto the cores 13f to 13i, it is propagated in the cores 13d, 13e and 13a, is emitted from the core 13a, transmits through the filter element 15 and is coupled to the optical fiber 17c. In addition, even when a part of the light of the wavelength λ1 which was propagated in the core 13a enters the core 13b side, since the core 13b is also in the multiple mode for the light of the wavelength λ1, it is not coupled to the single-mode optical fiber 17b. Since the light of the wavelength λ1 is not made incident from the core 13b onto the optical fiber 17b, it does not become stray light.

In addition, although four-branching coupler was shown in this embodiment, a coupler of two-branching, eight-branching, 16-branching and the like may be used.

(Fourth Embodiment)

Figure 18:
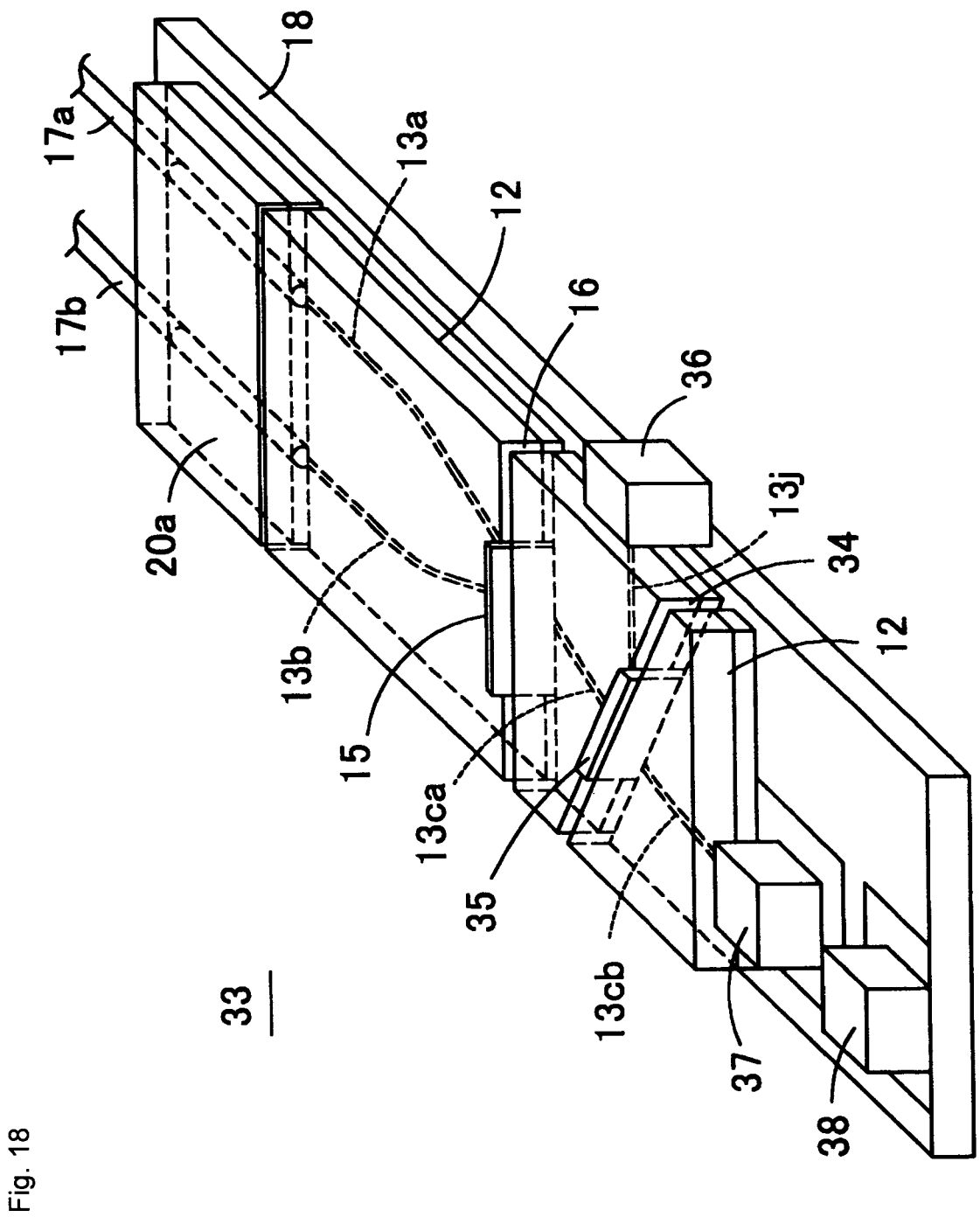
FIG. 18 shows a perspective view of an optical multiplexer/demultiplexer according to a fourth embodiment of the present invention.
Figure 19:
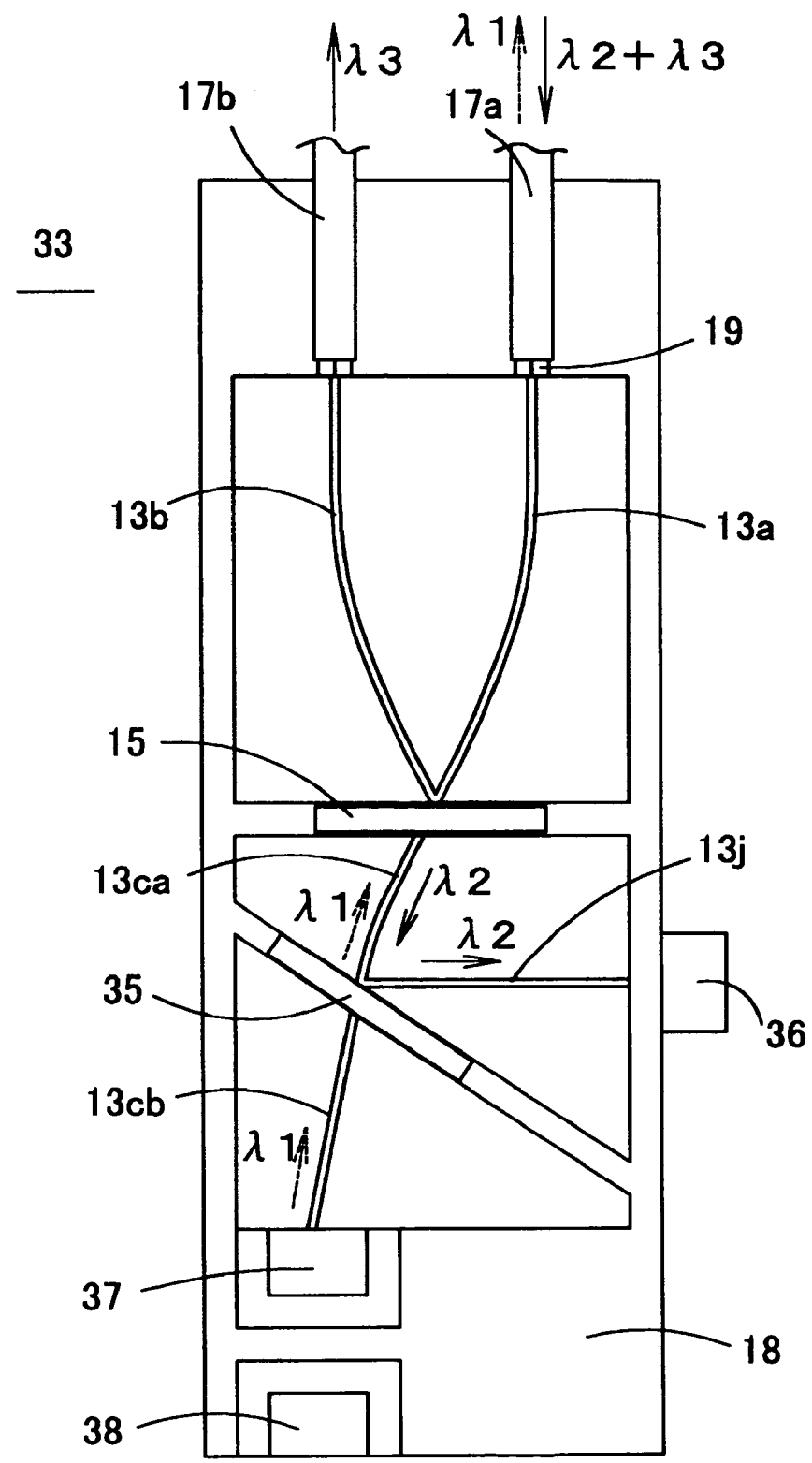
FIG. 19 shows a plan view of the optical multiplexer/demultiplexer.

FIG. 18 shows a perspective view of an optical multiplexer/demultiplexer 33 according to a fourth embodiment of the present invention, and FIG. 19 shows a plan view thereof. According to the optical multiplexer/demultiplexer 33, a third core 13c is split into a core 13ca and a core 13cd by providing a groove 34 so as to cross the clad 12 at a slant in the middle of the third core 13c in the optical multiplexer/demultiplexer 11 described in the first embodiment, and a filter element 35 is inserted in the groove 34. This filter element 35 has characteristics of making the light of the wavelength λ1 transmit therethrough and making the light of the wavelength λ2 reflect therefrom. In addition, a core 13j is provided so as to connect the end of the core 13ca facing the filter element 35 to a side face of the clad 12, between the filter element 15 and the filter element 35.

Optical fibers 17a and 17b coupled to the end faces of the cores 13a and 13b are positioned by V-shaped grooves 19 provided in an upper face of a silicon substrate 18 and pressed by a cover 20a. In addition, a light receiving element 36 such as a photodiode is provided at a position facing the end face of the core 13j, a light emitting element 37 such as a laser diode is provided at a position facing the end face of the core 13cb, and a light receiving element 38 for monitoring is provided behind the light emitting element 37.

According to this optical multiplexer/demultiplexer 33, the cores 13a, 13b and 13ca have the following relations:

Sectional area of the core 13b>sectional area of the core 13a

Sectional area of the core 13b>sectional area of the core 13ca

The sectional area of the core 13a may be the same as that of the core 13ca or may be different from that. More specifically, when it is assumed that the wavelengths of light to be used are λ1, λ2, λ3 (λ1<λ2<λ3, for example, λ1=1.31 µm, λ2=1.49 µm, λ3=1.55 µm), the core 13b is a single-mode core for the light of the wavelength λ3, and it is a multi-mode core for the light of the wavelengths λ1 and λ2, and the cores 13a and 13ca are single-mode cores for any light of the wavelengths λ1, λ2 and λ3 (that is, when it is assumed that cut-off wavelengths of the cores 13a and 13ca are λa and λca, and a cut-off wavelength of the core 13b is λb, the following relation is provided, that is, λa, λca<λ1<λ2<λb<λ3). The cores sections of the core 13cb and the core 13j are same as that of the core 13ca.

Thus, according to the optical multiplexer/demultiplexer 33, as shown by arrows of solid line in FIG. 19, when the light of the wavelength λ2 and the light of the wavelength λ3 are made incident from the optical fiber 17a onto the core 13a, the light is propagated in the core 13a and is emitted from the end face of thereof and, then, the light of the wavelength λ3 is reflected from the filter element 15, is propagated in the core 13b and is coupled to the optical fiber 17b, while the light of the wavelength λ2 transmits through the filter element 15. The transmitted light is made incident onto the core 13ca, is propagated in the core 13ca, is emitted from the end face of the core 13ca, is reflected from the filter element 35, is propagated in the core 13j, is emitted from the core 13j and is received by the light receiving element 36. At this time, even if a part of the light of the wavelength λ2 which has been propagated in the core 13a enters the core 13b side at the end of the core 13a, since the core 13b is in the multiple mode for the light of the wavelength λ2, it is not coupled to the single-mode optical fiber 17b. As a result, noise caused when the light of the wavelength λ2 is made incident from the core 13b onto the optical fiber 17b is not generated.

In addition, as shown by arrows of broken line in FIG. 19, when the light of the wavelength λ1 is emitted from the light emitting element 37, the light emitted from the light emitting element 37 is propagated in the core 13cb, is emitted from the core 13cb, transmits through the filter element 35, is made incident onto the core 13ca and is propagated in the core 13ca. The light of the wavelength λ1 emitted from the end face of the core 13ca transmits through the filter element 15, is made incident onto the core 13a, is propagated in the core 13a, is emitted from the end face of the core 13a, and is coupled to the optical fiber 17a. At this time, even when a part of the light of the wavelength λ1 transmitted through the filter element 15 enters the core 13b, since the core 13b is also in the multiple mode for the light of the wavelength λ1, it is not coupled to the single-mode optical fiber 17b and noise caused when the light of the wavelength λ1 is made incident from the core 13b onto the optical fiber 17b is not generated.

In addition, although the light receiving element 36 is connected to the core 13j in this embodiment, when an optical fiber is connected to the core 13j instead of the light receiving element 36, the following relation may be provided:

Sectional area of the core 13j>sectional area of the core 13ca

Sectional area of the core 13j>sectional area of the core 13cb

The sectional area of the core 13ca may be the same as that of the core 13cb or it maybe different from that. More specifically, the core 13j is the single-mode core for the light of the wavelength λ2 and it is the multi-mode core for the light of the wavelength λ1. The cores 13ca and 13cb are single-mode cores for the light of the wavelength λ1 and the light of the wavelength λ2 (when it is assumed that cut-off wavelengths of the cores 13ca and 13cb are λca and λcb, and a cut-off wavelength of the core 13j is λj, the following relation is provided, that is, λca, λcb<λ1<λj<λ2). According to the above constitution, since the light of the wavelength λ1 emitted from the light emitting element 37 and transmitted through the filter element 35 is propagated in the 13j in the multiple mode, even when the light of the wavelength λ1 enters the core 13j, it is not coupled to the optical fiber.

(Fifth Embodiment)

Figure 20:
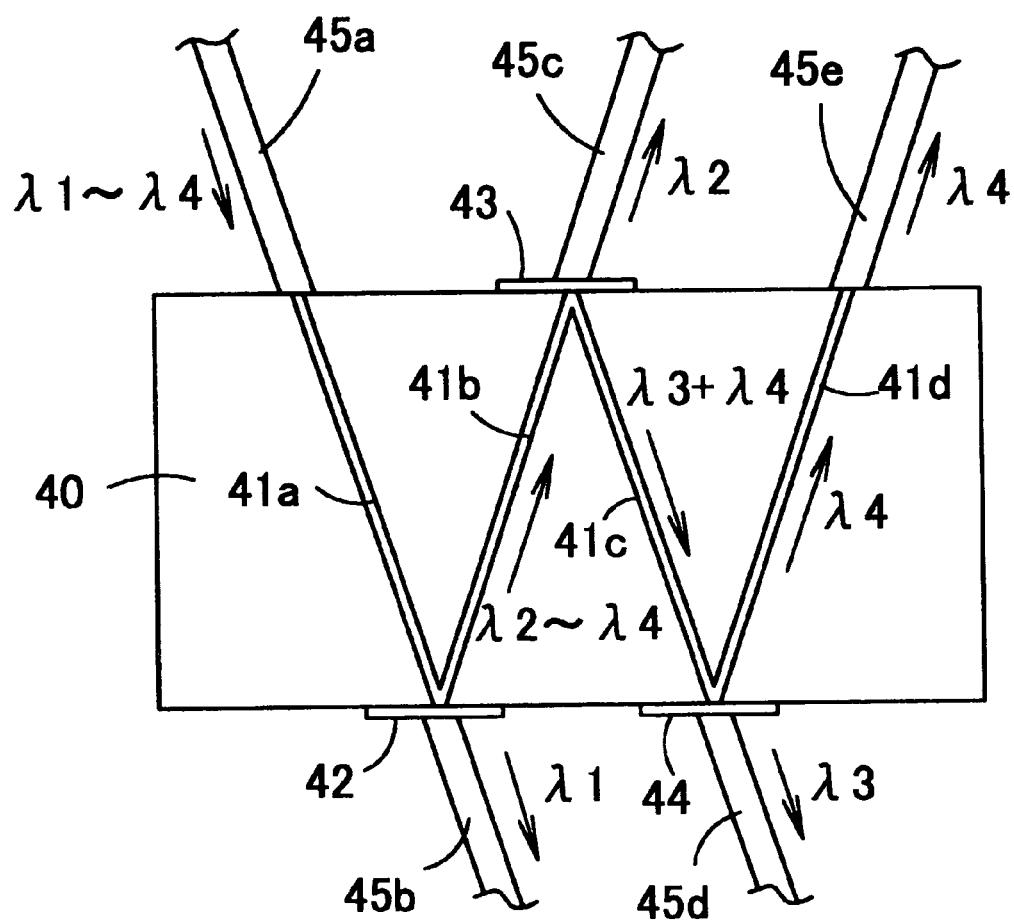
FIG. 20 shows a plan view of an optical multiplexer/demultiplexer according to a fifth embodiment of the present invention.

FIG. 20 shows a plan view of a structure of an optical multiplexer/demultiplexer 39 according to a fifth embodiment of the present invention. According to the optical multiplexer/demultiplexer 39, a plurality of cores 41a, 41b, 41c and 41d are formed in zigzags in a clad 40 and the cores 41a, 41b, 41c and 41d are exposed at both end faces of the clad 40. A filter element 42 is bonded to the end face of the clad 40 to which the cores 41a and 41b are connected, a filter element 43 is bonded to the end face of the clad 40 to which the cores 41b and 41c are connected, and a filter element 44 is bonded to the end face of the clad 40 to which the cores 41c and 41d are connected. In addition, an optical fiber 45a is connected to an end face of the core 41a, an optical fiber 45b is connected to the other end of the core 41a through the filter element 42, an optical fiber 45c is connected to an end face of the core 41b through the filter element 43, an optical fiber 45d is connected to an end face of the core 41c through the filter element 44, and an optical fiber 45e is connected to the end face of the core 41d. The optical fibers 45a to 45e are in the single mode for the light of used wavelengths ($\lambda 1$, $\lambda 2$, $\lambda 3$ and $\lambda 4$, in this embodiment).

The filter 42 has characteristics of making the light of the wavelength $\lambda 1$ among the light of the wavelengths $\lambda 1$, $\lambda 2$, $\lambda 3$ and $\lambda 4$ ($\lambda 1 < \lambda 2 < \lambda 3 < \lambda 4$) which is propagated in the core 41a transmit therethrough, and making the light of the wavelengths $\lambda 2$, $\lambda 3$ and $\lambda 4$ reflect therefrom. The filter 43 has characteristics of making the light of the wavelengths $\lambda 1$ and $\lambda 2$ transmit therethrough and making the light of the wavelengths $\lambda 3$ and $\lambda 4$ reflect therefrom. The filter 44 has characteristics of making the light of the wavelengths $\lambda 1$, $\lambda 2$ and $\lambda 3$ transmit therethrough and making the light of the wavelength $\lambda 4$ reflect therefrom.

In addition, the core 41a is in the single mode for the light of the wavelengths $\lambda 1$, $\lambda 2$, $\lambda 3$ and $\lambda 4$. The core 41b is in the multiple mode for the light of the wavelength $\lambda 1$ and is in the single mode for the light of the wavelength $\lambda 2$, $\lambda 3$ and $\lambda 4$. The core 41c is in the multiple mode for the light of the wavelengths $\lambda 1$ and $\lambda 2$ and is in the single mode for the light of the wavelengths $\lambda 3$ and $\lambda 4$. The core 41d is in the multiple mode for the light of the wavelengths $\lambda 1$, $\lambda 2$ and $\lambda 3$ and is in the single mode for the light of the wavelength $\lambda 4$. As a result, the following relation is provided:

Sectional area of the core 41d>sectional area of the core 41c>sectional area of the core 41b>sectional area of the core 41a Thus, according to the optical multiplexer/demultiplexer 39, when the light of the wavelength $\lambda 1$, the light of the wavelength $\lambda 2$, the light of the wavelength $\lambda 3$ and the light of the wavelength $\lambda 4$ are simultaneously made incident from the optical fiber 45a onto the core 41a, the light of each of the wavelengths $\lambda 1$ to $\lambda 4$ is propagated in the core 41a and, then, the light of the wavelength $\lambda 1$ transmits through the filter element 42 and is coupled to the optical fiber 45b while the light of the wavelengths $\lambda 2$ to $\lambda 4$ is reflected from the filter element 42 and is propagated in the core 41b.

Among the light propagated in the core 41b, the light of the wavelength $\lambda 2$ transmits through the filter element 43 and is coupled to the optical fiber 45c, and the light of the wavelengths $\lambda 3$ and $\lambda 4$ is reflected from the filter element 43 and is propagated in the core 41c. Here, even when a part of the light of $\lambda 1$ enters the core 41b from the core 41a and is propagated in the core 41b, since the light of the wavelength $\lambda 1$ is propagated in the core 41b in the multiple mode, it cannot to be coupled to the optical fiber 45c even if it could transmit through the filter element 43.

In addition, among the light propagated in the core 41c, the light of the wavelength $\lambda 3$ transmits through the filter element 44 and is coupled to the optical fiber 45d, while the light of the wavelength $\lambda 4$ is reflected from the filter element 44 and is propagated in the core 41d. Here, even when a part of the light of $\lambda 2$ enters the core 41c from the core 41b and is propagated in the core 41c, since the light of the wavelength $\lambda 2$ is propagated in the core 41c in the multiple mode, it cannot to be coupled to the optical fiber 45d even if it could transmit through the filter element 44.

The light of the wavelength $\lambda 4$ propagated in the core 41d is coupled to the optical fiber 45e. Here, even when a part of the light of the wavelength $\lambda 3$ enters the core 41d from the core 41c and is propagated in the core 41d, since the light of the wavelength $\lambda 3$ is propagated in the core 41d in the multiple mode, it cannot be coupled to the optical fiber 45e.

According to the optical multiplexer/demultiplexer of the present invention, it can be prevented that the light other than the light of the longest wavelength enters the core in which the light of the longest wavelength is to be propagated through a part in which the cores are connected, and becomes noise or stray light.

What is claimed is:

1. An optical multiplexer/demultiplexer comprising:
a plurality of cores optically interconnected for propagating light; and
a filter element disposed at a place in which the cores are optically interconnected, for passing or reflecting light of a specific wavelength, the optical multiplexer/demultiplexer separating light of a desired wavelength from single-mode light of a plurality of different wavelengths being propagated in one core by the filter element so that the light of the desired wavelength is propagated in another core, or combining light of different wavelengths being propagated in the different cores by the filter element so that the light of the different wavelengths is propagated in another core,
wherein a sectional area of a core, which is adapted for propagating light of a longest wavelength of a plurality of wavelengths among the cores, propagates the light of the longest wavelength in a single-mode and propagates light of another wavelength in a multiple-mode where the light of the other wavelength enters the core.

2. The optical multiplexer/demultiplexer according to claim 1, wherein a sectional area of the core which is adapted for propagating the light of the longest wavelength is selected such that the light of the longest wavelength is propagated in the single-mode and the light of the other wavelength is propagated in the multiple-mode.

3. An optical multiplexer/demultiplexer comprising:
a plurality of cores optically interconnected in zigzags, for propagating light; and
a plurality of filter elements disposed respectively at places in which the cores are optically interconnected, for passing or reflecting light of a specific wavelength,
wherein single-mode light of a plurality of different wavelengths being propagated in a core reaches a filter element, the filter element passes light of a shortest wavelength of a plurality of wavelengths among the input light of different wavelengths therethrough and reflects light of another wavelength, and
a sectional area of the core in which is adapted for propagating light immediately after reflected by the filter element propagates the light of the wavelength reflected by the one filter element in the single-mode, and propagates the light of the other wavelength in a multiple-mode where the light of the other wavelength to be passed through the filter element enters the core.

4. An optical multiplexer/demultiplexer, comprising:
a filter element, wherein the filter is configured to reflect light of a specific wavelength and pass light of another wavelength;

a first core optically connected to the filter element, wherein a sectional area of the first core is configured to propagate light of a plurality of wavelengths in a single-mode;

a second core optically connected to the first core to receive the light of the specific wavelength reflected by the filter element, wherein a sectional area of the second core is configured to propagate the light of the specific wavelength in a single-mode and propagate the light of the other wavelength in a multiple-mode;

a third core optically connected to the first core to receive the light of the other wavelength passed through the filter element, wherein a sectional area of the third core is configured to propagate the light of the plurality of wavelengths in a single-mode.

5. The optical multiplexer/demultiplexer according to claim 4, wherein the light of the plurality of wavelengths propagated in the first core is separated into the light of the specific wavelength and the light of the other wavelength by the filter element such that the light of the specific wavelength enters the second core and the other wavelength enters the third core.

6. The optical multiplexer/demultiplexer according to claim 5, wherein some of the light of the other wavelength is propagated in the second core in the multiple-mode in a case where the some of the light of the other wavelength enters the second core.

7. The optical multiplexer/demultiplexer according to claim 4, wherein the light of the specific wavelength propagated in the second core is reflected by the filter and enters the first core, and the light of the other wavelength propagated in the third core passes through the filter element and enter the first core, thereby the light of the specific wavelength and the light of the other wavelength are combined.

* * * * *